(12) United States Patent
Nohara et al.

(10) Patent No.: US 6,886,532 B2
(45) Date of Patent: May 3, 2005

(54) INTAKE SYSTEM OF INTERNAL COMBUSTION ENGINE

(75) Inventors: Tsuneyasu Nohara, Kanagawa (JP); Shinichi Takemura, Yokohama (JP); Shunichi Aoyama, Kanagawa (JP); Takanobu Sugiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 10/077,924

(22) Filed: Feb. 20, 2002

(65) Prior Publication Data

US 2002/0129780 A1 Sep. 19, 2002

(30) Foreign Application Priority Data

| Mar. 13, 2001 | (JP) | ............................ 2001-069870 |
| Mar. 19, 2001 | (JP) | ............................ 2001-077467 |
| Mar. 23, 2001 | (JP) | ............................ 2001-083960 |

(51) Int. Cl.⁷ ............................ F01L 1/34; F02M 35/10
(52) U.S. Cl. .................... 123/401; 123/572; 123/90.16; 123/184.42
(58) Field of Search .................... 123/184.21, 184.53, 123/184.57, 184.61, 193.5, 198 E, 468, 572, 469, 574, 470, 195 R, 195 A, 90.11, 90.15, 90.16, 90.22, 90.31, 322, 336, 345, 347

(56) References Cited

U.S. PATENT DOCUMENTS

| 3,111,120 A | * | 11/1963 | Cornell ........................ 123/54.4 |
| 3,662,723 A | * | 5/1972 | Buhl ............................ 123/323 |
| 4,446,823 A | * | 5/1984 | Bessho .................... 123/184.42 |
| 4,528,958 A | * | 7/1985 | Yoshida et al. ......... 123/184.42 |
| 4,603,673 A | * | 8/1986 | Hiraoka et al. .............. 123/572 |
| 4,771,740 A | * | 9/1988 | Koike .................... 123/184.42 |
| 4,907,547 A | * | 3/1990 | Daly ...................... 123/184.53 |
| 4,966,120 A | * | 10/1990 | Itoh et al. .................... 123/516 |
| 5,005,553 A | * | 4/1991 | Washizu et al. ............. 123/572 |
| 5,123,388 A | | 6/1992 | Kanesaka |
| 5,259,356 A | * | 11/1993 | Karlsson et al. ............. 123/541 |
| 5,329,894 A | * | 7/1994 | Phoenix et al. ........... 123/90.15 |
| 5,331,931 A | * | 7/1994 | Blish et al. ............... 123/90.11 |
| 5,778,840 A | * | 7/1998 | Murata et al. ............ 123/90.17 |
| 5,794,602 A | * | 8/1998 | Kimura ....................... 123/572 |
| 5,873,335 A | * | 2/1999 | Wright et al. ............ 123/198 D |
| 5,931,128 A | * | 8/1999 | Murata et al. ............ 123/90.17 |
| 6,024,188 A | * | 2/2000 | Yamaguchi et al. ......... 181/204 |
| 6,039,029 A | * | 3/2000 | Nagasaka et al. ............ 123/336 |
| 6,082,343 A | * | 7/2000 | Oishi et al. .................. 123/572 |
| 6,085,707 A | * | 7/2000 | Nemoto et al. ........... 123/90.15 |
| 6,089,202 A | * | 7/2000 | Nomura et al. ......... 123/184.42 |
| 6,109,231 A | * | 8/2000 | Watanabe et al. ....... 123/184.42 |

(Continued)

FOREIGN PATENT DOCUMENTS

| JP | 55-107011 A | | 8/1980 | |
| JP | 215960 | * | 12/1984 | .......... F02M/53/00 |
| JP | 4-005457 A | | 1/1992 | |
| JP | 8-042381 A | | 2/1996 | |
| JP | 8-334070 A | | 12/1996 | |
| JP | 9-209786 A | | 8/1997 | |
| JP | 11-93786 | | 4/1999 | |
| JP | 2001-065321 A | | 3/2001 | |
| JP | 155716 | * | 5/2002 | .......... F01L/13/00 |

Primary Examiner—Hai Huynh
(74) Attorney, Agent, or Firm—Foley & Lardner LLP

(57) ABSTRACT

A collector equipped intake system of an internal combustion engine, the collector is fixedly connected directly to either of a cylinder-head side wall and a collector mounting bracket hermetically covering perimeters of intake-port opening end portions of a plurality of intake ports opening through the side wall. A plurality of intake-manifold branches respectively communicating with the plurality of intake ports, are protruded into the interior space of the collector.

27 Claims, 15 Drawing Sheets

U.S. PATENT DOCUMENTS

| | | | |
|---|---|---|---|
| 6,196,186 B1 * | 3/2001 | Nagasaka et al. | 123/184.42 |
| 6,209,501 B1 * | 4/2001 | Kaneko | 123/184.21 |
| 6,267,092 B1 * | 7/2001 | Matsumoto et al. | 123/184.57 |
| 6,269,797 B1 * | 8/2001 | Uchida | 123/468 |
| 6,321,720 B1 * | 11/2001 | Kashima | 123/470 |
| 6,390,041 B2 * | 5/2002 | Nakamura et al. | 123/90.15 |
| 6,408,806 B2 * | 6/2002 | Sugiyama et al. | 123/90.15 |
| 6,422,221 B2 * | 7/2002 | Pietrowski et al. | 123/184.61 |
| 6,499,454 B2 * | 12/2002 | Miyazato et al. | 123/90.31 |
| 6,513,467 B2 * | 2/2003 | Nohara et al. | 123/90.15 |
| 6,550,436 B2 * | 4/2003 | Nohara et al. | 123/90.16 |
| 6,578,534 B2 * | 6/2003 | Nohara et al. | 123/90.16 |
| 6,615,775 B2 * | 9/2003 | Takemura et al. | 123/90.15 |
| 6,626,135 B2 * | 9/2003 | Takemura et al. | 123/90.17 |
| 6,647,935 B2 * | 11/2003 | Aoyama et al. | 123/90.16 |
| 6,659,054 B2 * | 12/2003 | Sugiyama et al. | 123/90.16 |
| 2002/0185100 A1 * | 12/2002 | Matsumoto et al. | 123/184.21 |

* cited by examiner

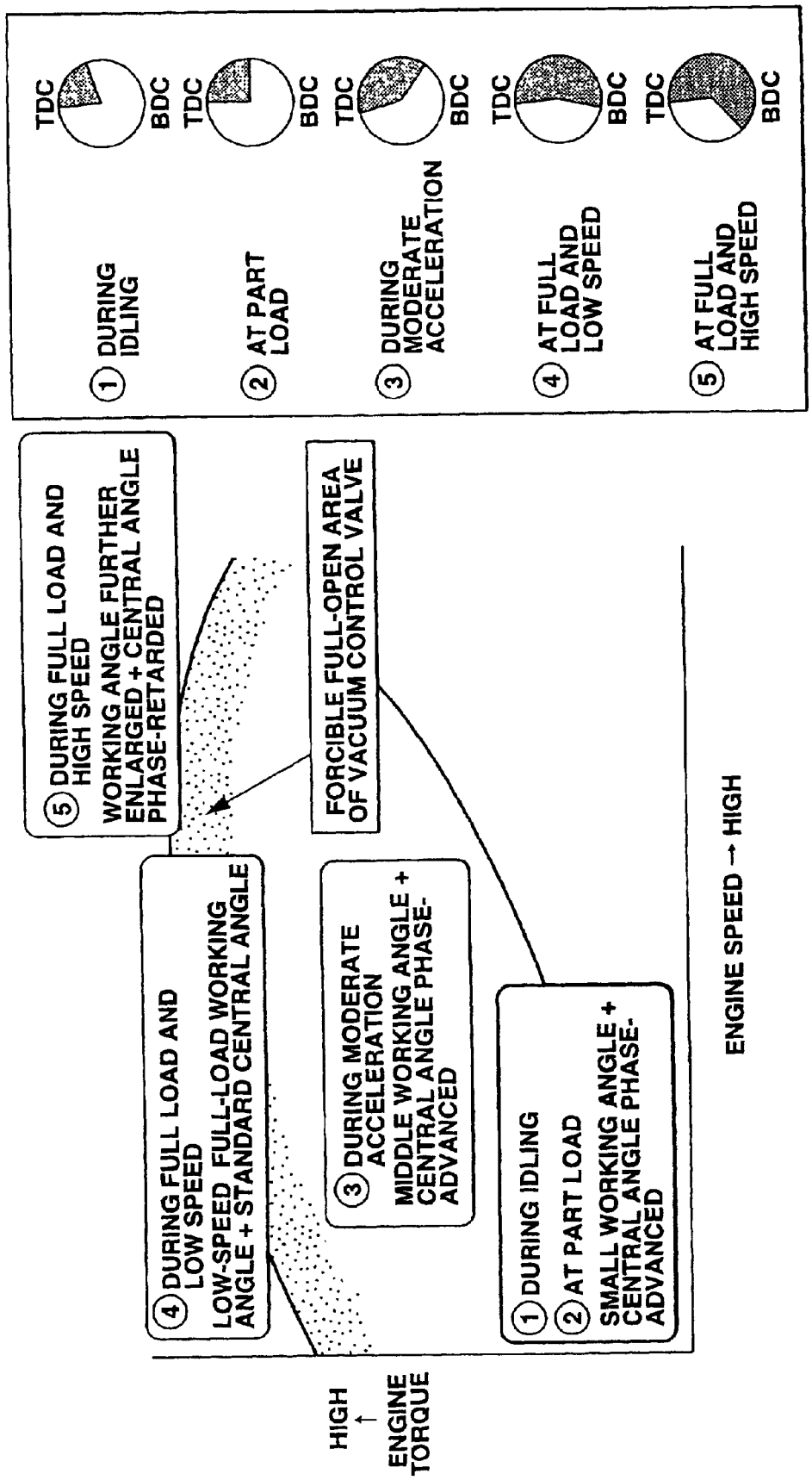

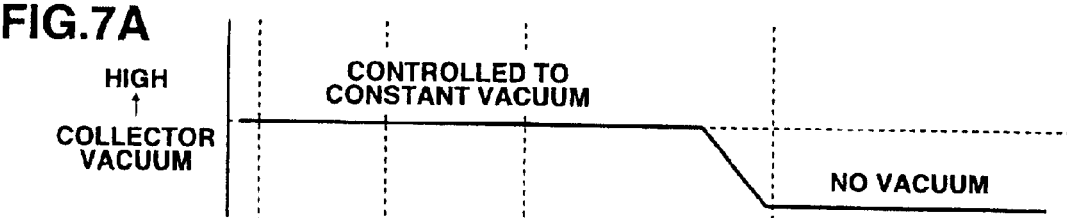
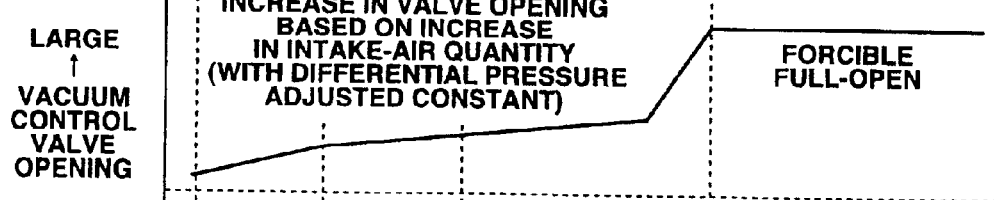
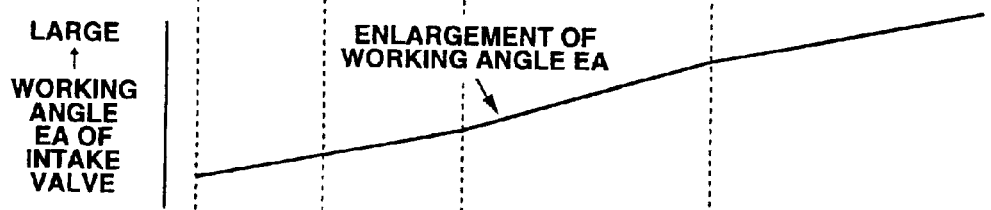
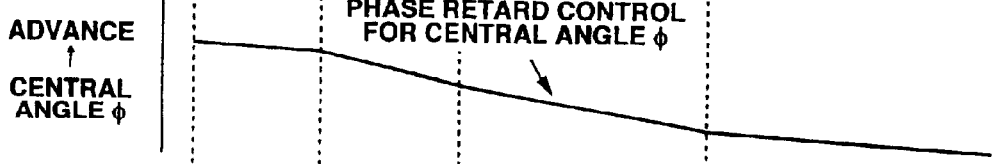
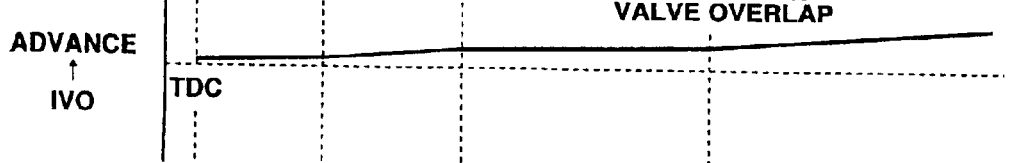
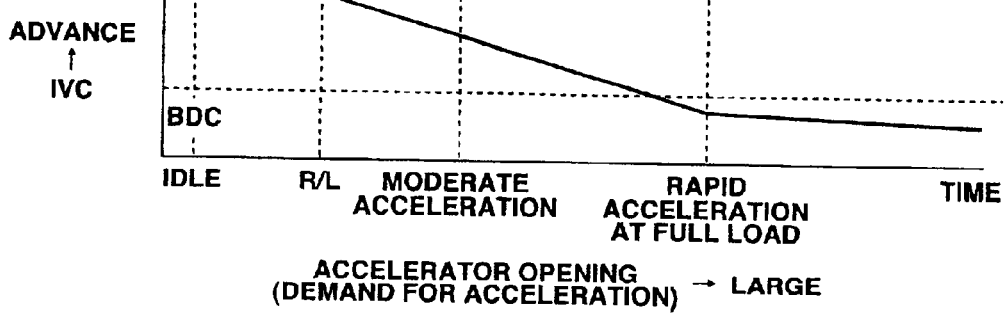

DURING HIGH-LOAD

DURING MID-LOAD

DURING IDLING

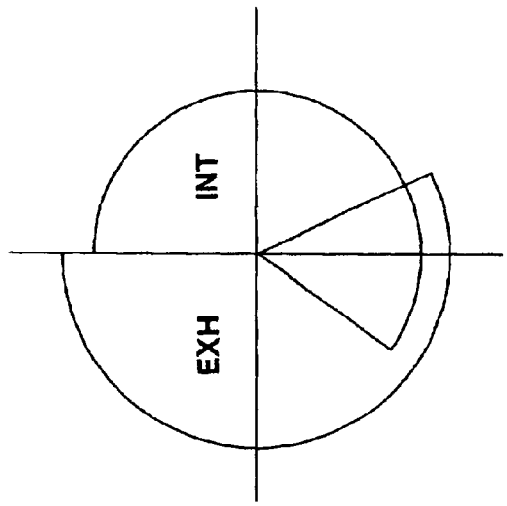
FIG.15C DURING HIGH-LOAD
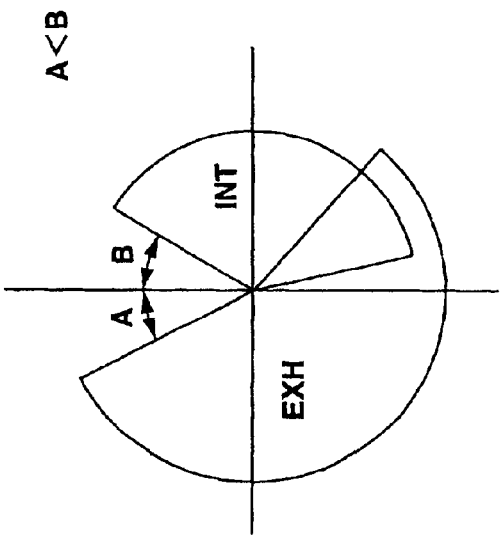
FIG.15B DURING MID-LOAD
A<B
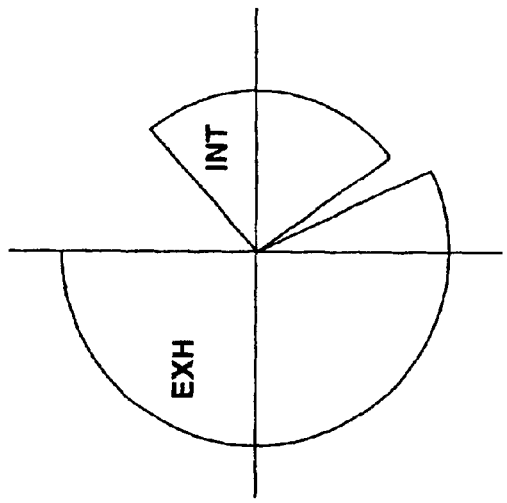
FIG.15A DURING IDLING

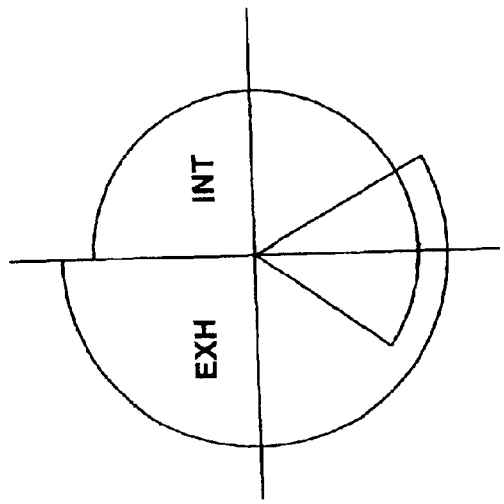
FIG.16A DURING IDLING
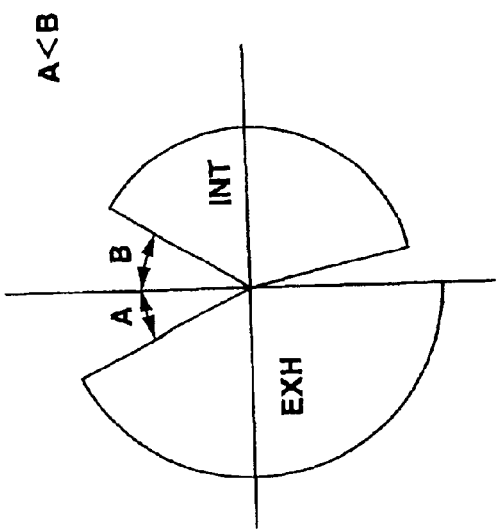
FIG.16B DURING MID-LOAD
A<B
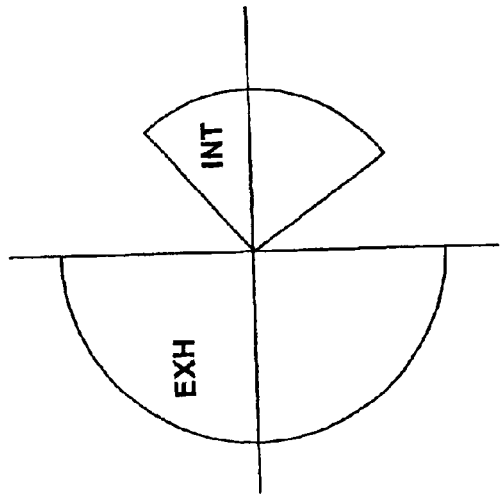
FIG.16C DURING HIGH-LOAD

INTAKE SYSTEM OF INTERNAL COMBUSTION ENGINE

TECHNICAL FIELD

The present invention relates to an intake system of an internal combustion engine, and specifically to technologies for a collector equipped intake system of an internal combustion engine.

BACKGROUND ART

Collector equipped intake systems for an internal combustion engine are well known. On such collector equipped intake systems, it would be desirable to ensure simplicity in installation and to enhance the supporting rigidity, simplifying the construction of the intake system without reducing dynamic characteristics of air drawn into the engine.

SUMMARY OF THE INVENTION

Accordingly, it is an object of the invention to provide a compactly designed, collector equipped intake system of an internal combustion engine, which is capable of enhancing design simplicity, simplicity in installation, and supporting rigidity without sacrificing dynamic characteristics of air drawn into the engine, and of reducing noise and vibration input to the collector.

It is another object of the invention to provide a compactly designed, collector equipped intake system with variable valve actuation system interaction, which is capable of realizing both the shortened axial length of each of intake-manifold branches and enlarged capacity of the collector.

It is a further object of the invention to provide a compactly designed, collector equipped intake system with vacuum control valve interaction, which is capable of enhancing combustion stability during low load operation such as idling and of enhancing charging efficiency during high load operation.

In order to accomplish the aforementioned and other objects of the present invention, an intake system of an internal combustion engine comprises a collector fixedly connected directly to either of a side wall of a cylinder head and a collector mounting bracket hermetically covering perimeters of intake-port opening end portions of a plurality of intake ports opening through the side wall, and a plurality of intake-manifold branches respectively communicating with the plurality of intake ports and protruded into an interior space of the collector.

The other objects and features of this invention will become understood from the following description with reference to the accompanying drawings.

BRIEF DESCRIPTION OF THE DRAWINGS

FIG. 6 is a chart illustrating valve lift characteristics under exemplary operating conditions of the engine.

FIGS. 7A–7F are timing charts showing the relationship among a collector vacuum, a vacuum control valve opening, a working angle EA of an intake valve, a phase of a central angle $\phi$ of the working angle of the intake valve, intake valve closure timing IVC, and intake valve open timing IVO.

FIGS. 15A–15C are 2nd valve timing characteristics, respectively showing idling, a middle load condition, and a high load condition.

FIGS. 16A–16C are 3rd valve timing characteristics, respectively showing idling, a middle load condition, and a high load condition.

DESCRIPTION OF THE PREFERRED EMBODIMENTS

Figure 3:
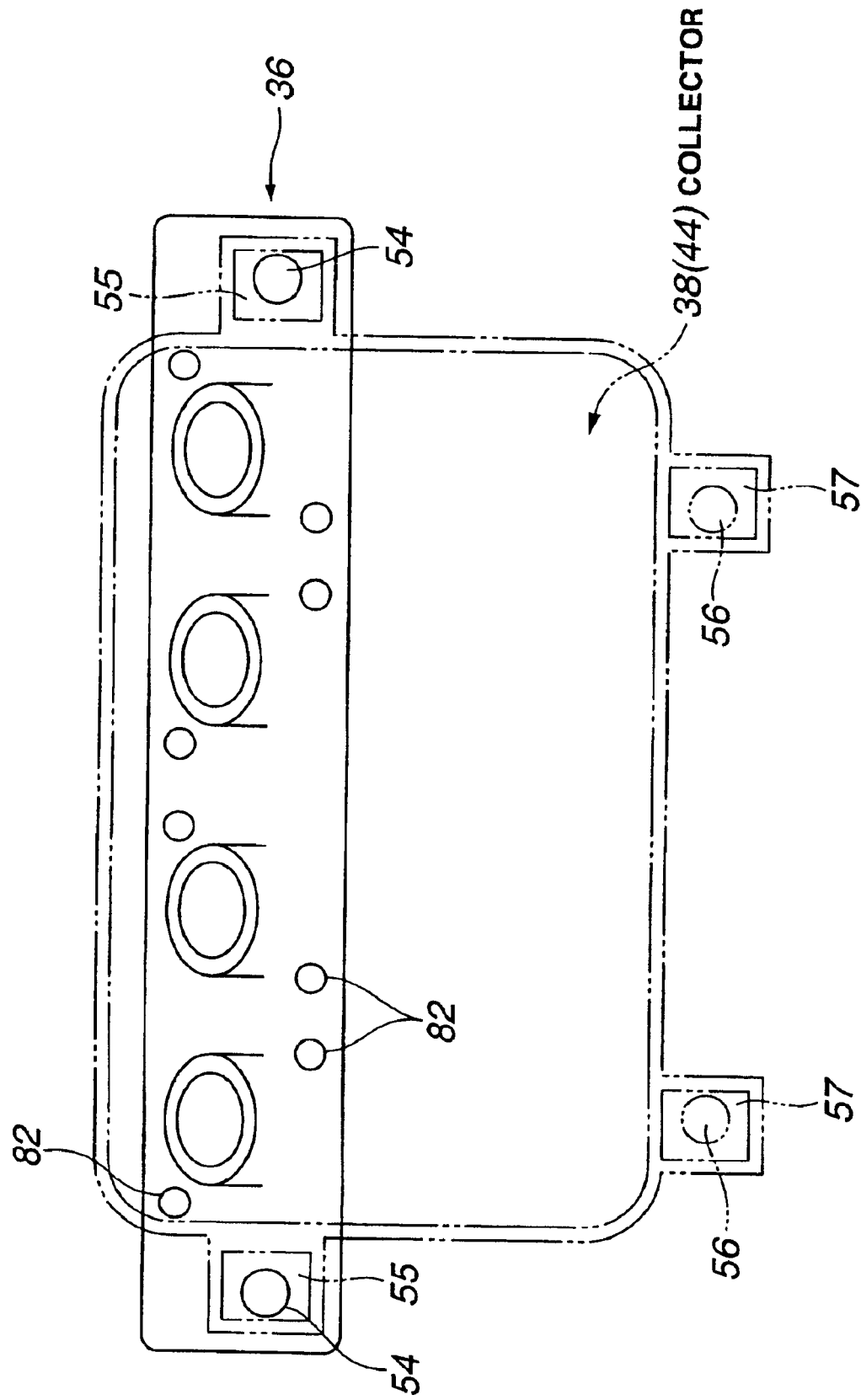
FIG. 3 is an explanatory view illustrating a state of installation of a collector on a collector mounting bracket.
Figure 4:
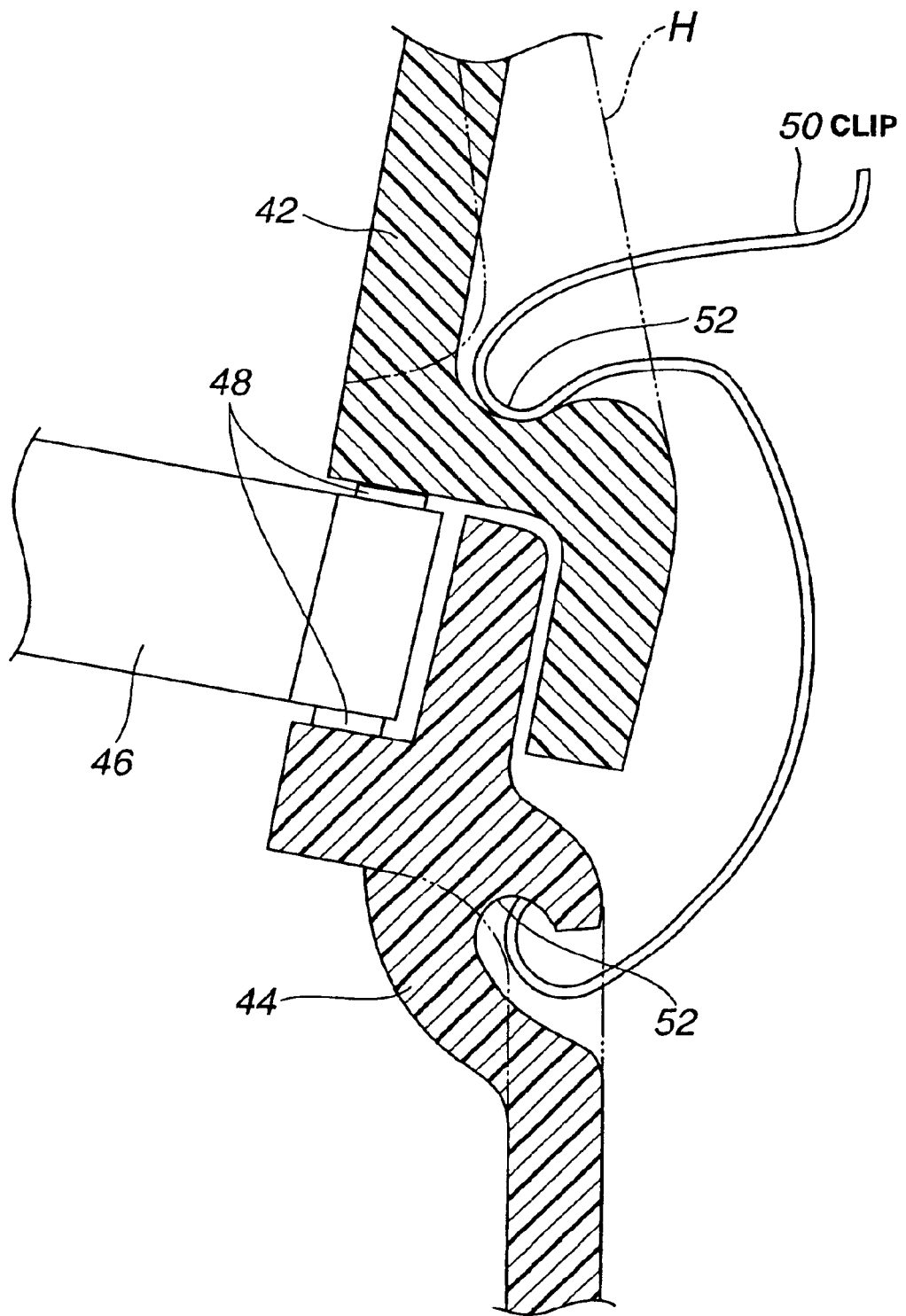
FIG. 4 is an enlarged cross sectional view showing the connecting portion between two-split collector component parts.
Figure 5:
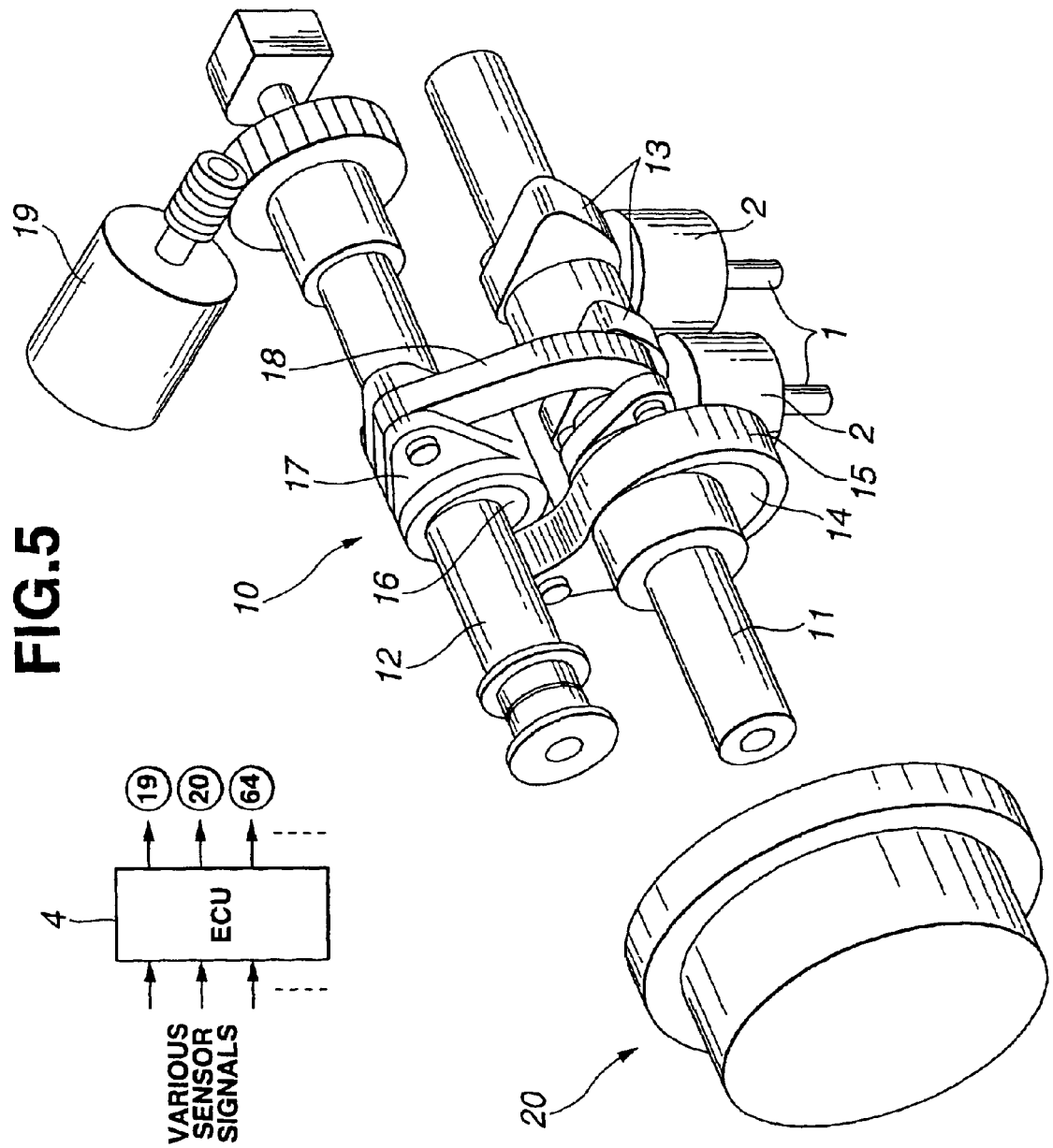
FIG. 5 is a perspective view illustrating a variable valve actuation system.

Referring now to the drawings, particularly to FIGS. 1–4, the intake system of the embodiment is exemplified in a four-cycle gasoline engine. The internal combustion engine having the intake system of the embodiment is further equipped with a variable valve actuation system shown in FIG. 5. The variable valve actuation system of FIG. 5 is combined with an intake system of the second embodiment (described later in reference to FIGS. 10 and 11) and an intake system of the third embodiment (described later in reference to FIGS. 12 and 13), in addition to the intake system of the first embodiment of FIGS. 1–4. The variable valve actuation system serves to variably adjust a valve lift characteristic (a valve timing and a valve lift) of an intake valve 1. The variable valve actuation system is comprised of a variable lift and working angle control mechanism (or a variable valve event and lift mechanism) 10 and a variable phase control mechanism 20. Variable lift and working angle control mechanism 10 serves to continuously variably adjust the working angle and lift of intake valve 1. Variable phase control mechanism 20 serves to continuously variably adjust a phase of a central angle of the working angle of intake valve 1 (the angular phase at the maximum valve lift point of intake valve 1) with respect to an engine crankshaft (not shown). Variable lift and working angle control mechanism 10 includes a drive shaft 11 and a control shaft 12 both extending in the cylinder row direction and arranged parallel to each other. Drive shaft 11 is rotated about its axis by torque transmitted from the crankshaft to the drive shaft. Rockable cam 13 is oscillatingly fitted onto the outer periphery of drive shaft 11. Rockable cam 13 is in abutted-engagement with a valve lifter or a tappet 2 attached to the upper portion of the valve stem of intake valve 1. Eccentric cam 14 is fixedly connected or integrally formed with drive shaft 11 for each engine cylinder. The axis of the outer peripheral surface of eccentric cam 14 is eccentric to the axis of drive shaft 11. A substantially ring-shaped first link 15 is rotatably fitted onto the outer periphery of eccentric cam 14. A control cam 16 is fixedly connected to or integrally formed with control shaft 12 for each engine cylinder. The axis of the outer peripheral surface of control cam 16 is eccentric to the axis of control shaft 12. A substantially cylindrical hollow central portion of a rocker arm 17 is rotatably fitted onto the outer periphery of control cam 16. Rocker arm 17 is connected at one end to the extruded portion of first link 15 in a manner so as to permit relative rotation of rocker arm 17 to first link 15. Rocker arm 17 is connected at the other end to one end of a rod-shaped second link 18 in a manner so as to permit relative rotation of rocker arm to second link 18. The other end of second link 18 is connected to the extruded portion of rockable cam 13 in a manner so as to permit relative rotation of second link 18 to rockable cam 13. With the previously noted arrangement, when drive shaft 11 rotates in synchronism with rotation of the crankshaft, a translation motion of first link 15 fitted onto eccentric cam 14 takes place. The translation motion of first link 15 is converted into an oscillating motion of rocker arm 17. The oscillating motion of rocker arm 17 is transmitted via second link 18 to rockable cam 13, thereby causing an oscillating motion of rockable cam 13. Rockable cam 13 is formed on its lower surface with a base-circle surface portion being concentric to drive shaft 11 and a moderately-curved cam surface portion being continuous with the base-circle surface portion and extending toward one end portion of rockable cam 13. The base-circle surface portion and the cam surface portion of rockable cam 13 are designed to be brought into abutted-contact (sliding-contact) with a designated point or a designated position of the upper surface of the associated intake-valve lifter 2, depending on an angular position of rockable cam 13 oscillating. That is, the base-circle surface portion functions as a base-circle section within which a valve lift is zero. A predetermined angular range of the cam surface portion being continuous with the base-circle surface portion functions as a ramp section. A predetermined angular range of a cam nose portion of the cam surface portion being continuous with the ramp section functions as a lift section. By virtue of cam action of rockable cam 13 oscillating, intake-valve lifter 2 is pushed and therefore intake valve 11 lifts. When control shaft 12 is driven within a predetermined angular range by means of a variable lift and working angle control actuator 19, the center of control cam 16 serving as a center of oscillating motion of rocker arm 17 varies. Owing to the change in the center of oscillating motion of rocker arm 17, attitudes of rocker arm 17, first link 15, and second link 18 vary. Therefore, a characteristic of oscillating motion of rockable cam 13 varies. As a consequence, both of the working angle and valve lift of intake valve 1 can be continuously adjusted.

In the previously discussed variable lift and working angle control mechanism 10, rockable cam 13, capable of opening and closing intake valve 1, is coaxially arranged on drive shaft 11. Thus, there is no possibility of an undesirable offset between the axis of rockable cam 13 and the axis of drive shaft 11. Such coaxial arrangement is superior in control accuracy. Variable lift and working angle control mechanism 10 is compactly designed, since rocker arm 17, first and second links 15 and 18 are concentrated around drive shaft 11. That is, the compactly designed variable lift and working angle control mechanism 10 is superior in simplicity in installation (time saved in installation). In the bearing portion between eccentric cam 14 and first link 15, there is wall contact between the outer peripheral wall surface of eccentric cam 14 and the inner peripheral wall surface of first link 15. In a similar manner, in the bearing portion between control cam 16 and rocker arm 17, there is wall contact between the outer peripheral wall surface of control cam 16 and the inner peripheral wall surface of rocker arm 17. In comparison with spot contact or line contact, the wall contact is superior in enhanced lubricating performance, and enhanced durability and reliability of moving parts. Variable lift and working angle control mechanism 10 is easily applicable to a conventional non-variable valve actuation system with a cam fixedly connected to a camshaft. That is, rockable cam 13 may be easily laid out within an installation space of the cam fixed to the camshaft, while the camshaft may be easily replaced with drive shaft 11. In other words, the compactly designed variable lift and working angle control mechanism 10 facilitates the design change from the conventional non-variable valve actuation system.

Variable phase control mechanism 20 is provided to continuously change the phase of the central angle of the working angle of intake valve 1 by changing the phase of drive shaft 11 relative to the crankshaft. A vane-type phase control mechanism or a helical-spline type phase control mechanism is widely used as the variable phase control mechanism. Variable phase control mechanism 20 is comprised of a sprocket (not numbered) and a phase control actuator (not numbered). The sprocket is provided at the front end of drive shaft 11 and has a driven connection with the engine crankshaft through a timing chain (not shown) or a timing belt (not shown). The phase control actuator is provided to enable drive shaft 11 to rotate relative to the sprocket within a predetermined angular range. The previously noted variable lift and working angle control actuator 19 and the phase control actuator are controlled in response to control signals from an electronic control unit (ECU) 4 which will be fully described later. Relative rotation of drive shaft 11 to the sprocket in one rotational direction results in a phase advance at the maximum intake-valve lift point (at the central angle of the working angle of intake valve 1). Relative rotation of drive shaft 11 to the sprocket in the opposite rotational direction results in a phase retard at the maximum intake-valve lift point. That is, only the phase of working angle (i.e., the angular phase at the central angle) is advanced or retarded, with no valve-lift change and no working-angle change. The relative angular position of drive shaft 11 to the sprocket can be continuously varied within limits by means of the phase control actuator, and thus the angular phase at the central angle also vary continuously.

ECU 4 generally comprises a microcomputer. ECU 4 includes an input/output interface (I/O), memories (RAM, ROM), and a microprocessor or a central processing unit (CPU). The input/output interface (I/O) of ECU 4 receives input information from various engine/vehicle sensors, namely engine speed, engine load, engine temperature and the like. Within ECU 4, the central processing unit (CPU) allows the access by the I/O interface of input informational data signals from the previously discussed engine/vehicle sensors. The CPU of ECU 4 is responsible for carrying the variable valve lift characteristic control (working angle and lift control/variable phase control) program as well as fuel-injection control program stored in memories and is capable of performing necessary arithmetic and logic operations based on operating conditions of the engine. Computational results (arithmetic calculation results), that is, calculated output signals (actuator drive currents) are relayed via the output interface circuitry of ECU 4 to output stages, namely electromagnetic fuel-injection valves, the variable phase control actuator and variable lift and working angle control actuator 19. The quantity of air drawn into the engine can be adjusted by changing the lift characteristic of intake valve 1. For instance, the intake-air quantity can be reduced by advancing the intake valve closure timing IVC from bottom dead center (BDC). It is possible to decrease the intake-air quantity by decreasingly compensating for both the working angle and valve lift of intake valve 1. The variable valve lift characteristic control for intake valve 1 eliminates the necessity of a throttle valve that is generally used to admit more or less intake air. In other words, it is possible to realize a throttle-less construction in the intake system.

Referring now to FIG. 6, there is shown the intake-valve lift characteristics under exemplary five different engine operating conditions, namely at idle, at part load whose condition is often abbreviated to "R/L (Road/load)" substantially corresponding to a ¼ throttle opening, during moderate acceleration, at full load and low speed, and at full load and high speed. As shown in FIG. 6, at the idling condition ① and at the part load condition ②, in order to reduce a pumping loss, the working angle of intake valve 1 is controlled to a comparatively small value, the central angle of the working angle of intake valve 1 is phase-advanced so that the intake valve open timing IVO is set nearby top dead center (TDC), and the intake valve closure timing IVC is phase-advanced to a considerably earlier point before bottom dead center (BBDC), thereby reducing the actual intake stroke.

Under the moderate acceleration condition ③, the working angle is somewhat enlarged in comparison with that of the idling condition ① or the part load condition ② and controlled to a substantially middle working angle. The phase of the central angle under moderate acceleration condition ③ is somewhat advanced, but phase-retarded as compared to the idling condition ① and part load condition ②.

Under the full load and low speed condition ④, the working angle of intake valve 1 is further increased as compared to moderate acceleration condition ③, and controlled to a low-speed full-load working angle suitable for low engine speed. Additionally, the phase of the central angle is controlled to a standard central angle retarded with respect to the central angle under moderate acceleration condition ③. Under the full load and low speed condition ④, the intake valve open timing IVO is adjusted to a timing point just before top dead center (BTDC), and additionally the intake valve closure timing IVC is adjusted to a timing point just after bottom dead center (ABDC), thereby enhancing the charging efficiency of intake air.

Under the full load and high speed condition ⑤, the working angle is further enlarged and additionally the phase of the central angle is further retarded in comparison with the full load and low speed condition ④. As a consequence, the intake valve closure timing IVC is further retarded to a timing point after BDC.

Figure 9:
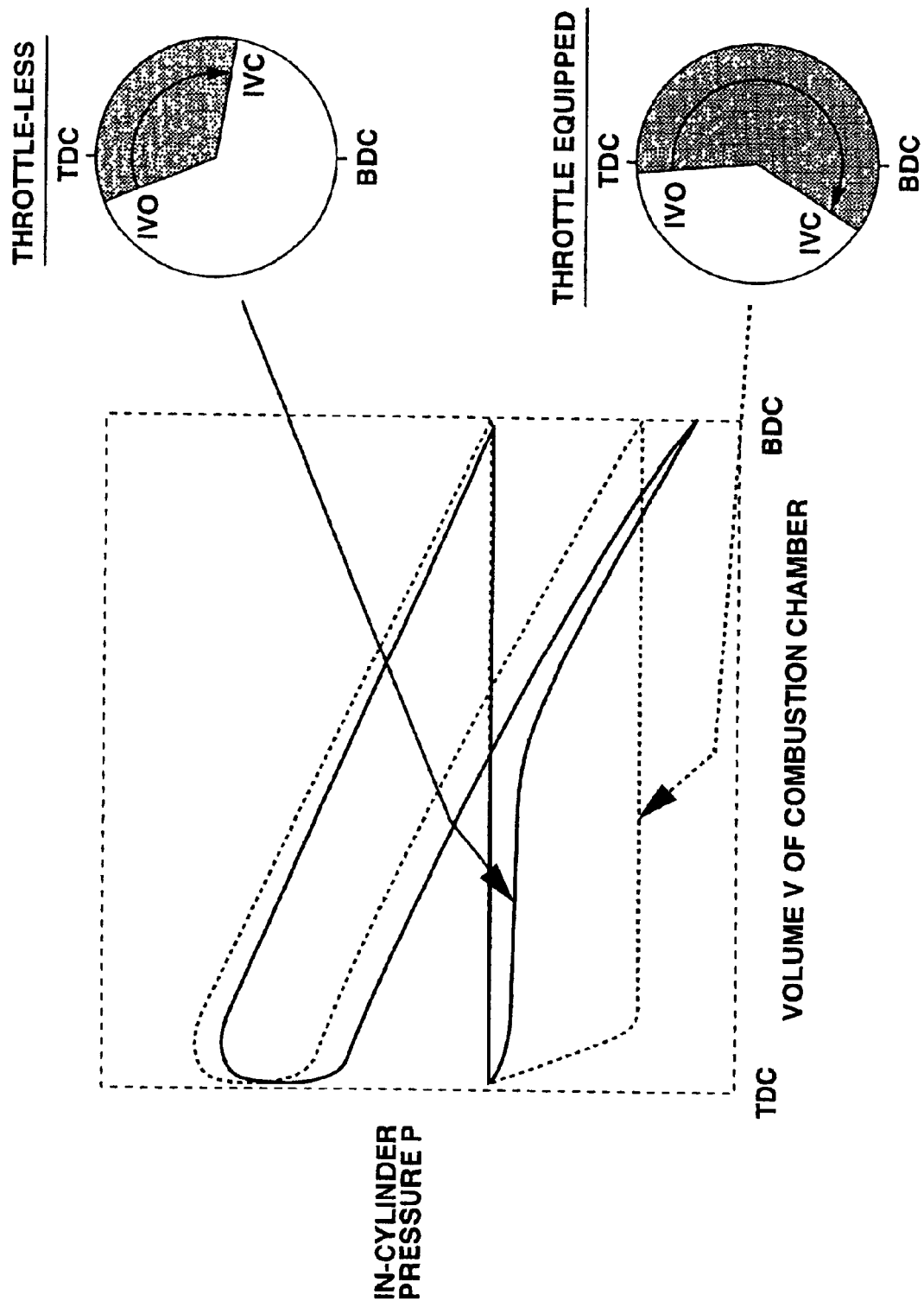
FIG. 9 shows pressure/volume diagrams (P-V diagrams) used to comparison between a pumping loss obtained by a throttle-less intake system and a pumping loss obtained by a throttle-equipped intake system.

As previously described, by virtue of the variable intake valve lift characteristic control, it is possible to provide the throttle-less construction in the intake system. The throttle-less construction is effective to reduce the pumping loss under low and middle load conditions. Referring to FIG. 9, there is shown the two different P-V diagrams respectively indicated by the solid line and the broken line. The P-V diagram indicated by the solid line is a diagram of a four-stroke cycle at part load operation and obtained by the throttle-less intake system with variable valve actuation system interaction. In contrast, the P-V diagram indicated by the broken line is a diagram of a four-stroke cycle at the same part load operation and obtained by the throttle equipped intake system. As can be appreciated from comparison between the two different P-V diagrams of FIG. 9, it is possible to greatly reduce the pumping loss by using the throttle-less intake system with variable valve actuation system interaction.

Returning to FIGS. 1–4, in the intake system of the first embodiment, a collector mounting bracket 36 is fixedly connected to an intake-port side wall 32 of a cylinder head 30, so that collector mounting bracket 36 hermetically covers the perimeters of intake-port opening end portions (35, 35, 35, 35) of a plurality of intake ports (34, 34, 34, 34). Intake ports 34 of a plurality of engine cylinders constructing a cylinder row are located on side wall 32. In the shown embodiment, the number of the cylinders is four. In the intake system of the first embodiment, note that one collector 38 is fixedly connected directly to collector mounting bracket 36. A plurality of intake-manifold branches (40, 40, 40, 40) are protruded into the interior space of collector 38. Intake-manifold branches (40, 40, 40, 40) communicate the respective intake ports (34, 34, 34, 34). As can be appreciated from the cross sections shown in FIGS. 1, 2, and 4, collector 38 has a two-split structure. Actually, collector 38 is split into two parts, namely an upper collector portion 42 and a lower collector portion 44, both made of a lightweight synthetic resin material. An air cleaner 46 is located in collector 38, so that air cleaner 46 is interleaved between two-split upper and lower collector portions 42 and 44. As best seen from the enlarged cross section of FIG. 4, upper and lower collector portions 42 and 44 are detachably connected to each other by means of a clip 50, so that air cleaner 46 and a gasket 48 are sandwiched between upper and lower collector portions 42 and 44 in an air-tight fashion. Each of upper and lower collector portions 42 and 44 is partially formed with a recessed portion 52, which is brought into engagement with the clip when assembling upper and lower collector portions 42 and 44. The two-dotted line H of FIG. 4 shows a cross section of each of upper and lower collector portions 42 and 44, except for recessed portions 52 engaged with clip 50. As shown in FIG. 3, lower collector portion 44 constructing a major part of collector 38 has upper-flanged portions (55, 55) and lower-flanged portions (57, 57). Upper-flanged portions (55, 55) are fixedly connected to collector mounting bracket 36 by means of bolts (54, 54). Similarly, lower-flanged portions (57, 57) are fixedly connected to cylinder head 30 or to cylinder block 31 by means of bolts (56, 56) or to amounting bracket fixedly connected to either of the cylinder head and the cylinder block.

Figure 2:
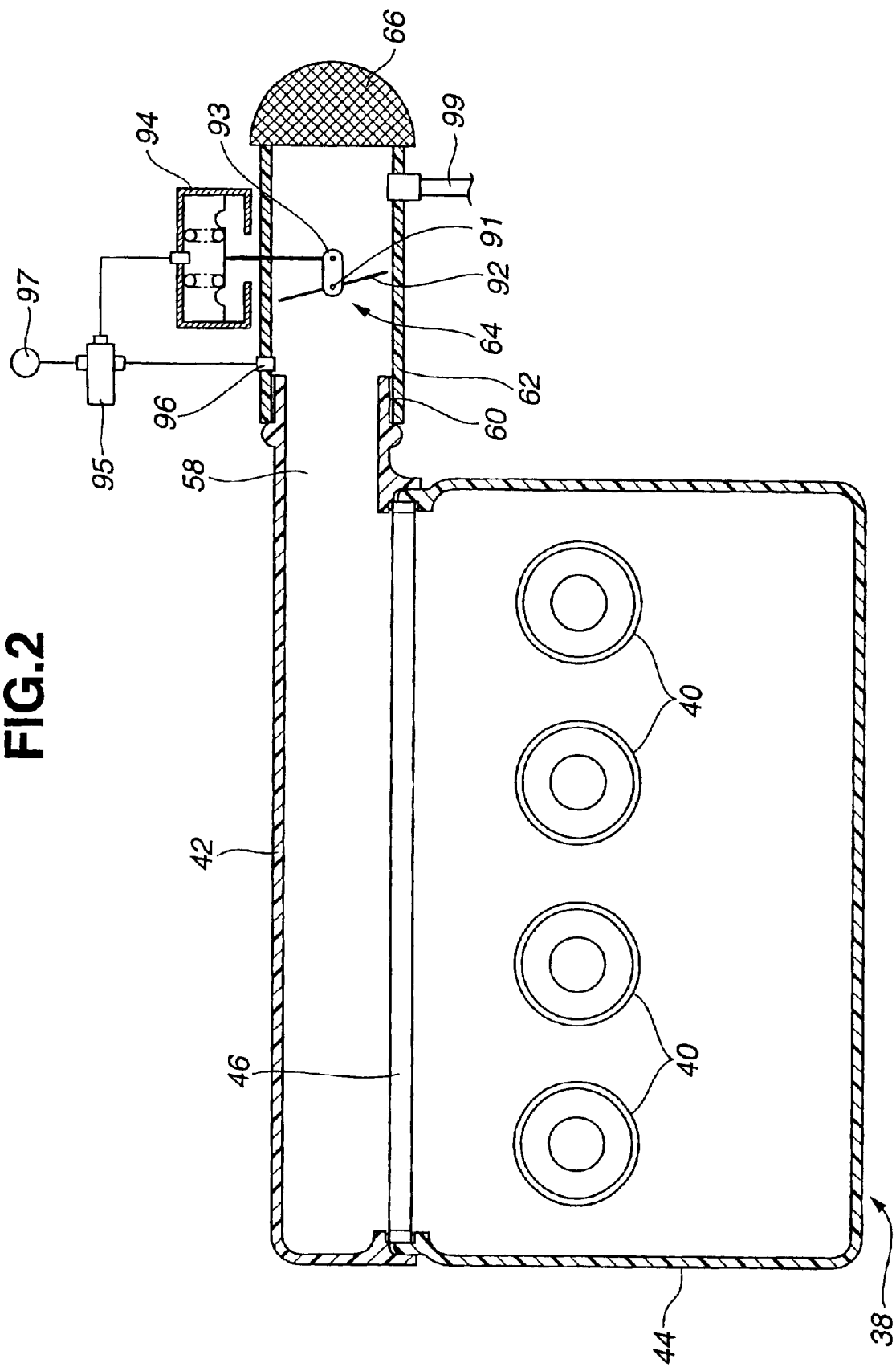
FIG. 2 is a cross-sectional view taken along the line II—II of FIG. 1.

Referring to FIG. 2, upper collector portion 42 is integrally formed with a substantially cylindrical intake-air inlet 58. An intake pipe 62 is connected to intake-air inlet 58, placing a gasket 60 between an inner peripheral surface of intake-air inlet 58 and an outer peripheral surface of intake pipe 62 to provide a tight seal between them. A pressure control valve (exactly, a vacuum control valve) 64 is disposed in intake pipe 62 upstream of the collector. Vacuum control valve 64 is provided to create a minimum vacuum needed for the engine (a vacuum-operated blow-by gas recirculation system, an evaporative emission control system employing a vacuum-operated purge valve, and the like), rather than adjusting the intake-air quantity. Vacuum control valve 64 is controlled in response to a control command from ECU 4, depending on engine operating conditions, such as engine speed and engine load (an accelerator opening or a throttle opening). A filter 66 having a lower filtering function (larger meshes) than air cleaner 46 is installed on the opening end of intake pipe 62, so as to remove dust, dirt, and other contaminants and to prevent a mechanical problem such as a sticking vacuum control valve which may occur owing to entry of dust, dirt, and other contaminants into intake pipe 62.

Returning to FIG. 1, as can be appreciated from the cross section of collector 38 cut by the vertical plane, lower collector portion 44 constructing a major part of collector 38 has a plurality of first branch portions (68, 68, 68, 68), a recessed portion 72, and a mounting plate portion 74, integrally formed with each other. Each of first branch portions 68 is substantially cylindrical in shape and protruded into the interior space of collector 38 (in particular, lower collector portion 44). Each of the first branch portions constructs a part of the associated intake-manifold branch 40. Recessed portion 72 is provided to avoid the interference between collector 38 and a fuel injection valve 70 that injects fuel spray into intake port 34. Mounting plate portion 74 is fixedly connected to collector mounting bracket 36 in such a manner as to be kept in wall contact with the flat surface portion of collector mounting bracket 36. Mounting plate portion 74 is relatively thick-walled in comparison with the other collector portions, to increase rigidity in installation.

In the same manner as cylinder head 30, collector mounting bracket 36 is made of aluminum alloy having a high rigidity. Collector mounting bracket 36 has a plurality of substantially cylindrical second branch portions (76, 76, 76, 76), an injector mounting boss portion 78, and a mounting plate portion 80, integrally formed with each other. Each of second branch portions 76 constructs the rest of the associated intake-manifold branch 40. Fuel injection valve 70 is mounted on or screwed into injector mounting boss portion 78. Mounting plate portion 80 is interleaved between side wall 32 of cylinder head 30 and mounting plate portion 74 of lower collector portion 44. As shown in FIG. 3, collector mounting bracket 36 is fixedly connected to side wall 32 of cylinder head 30 by way of fastening means such as a plurality of bolts 82. Returning again to FIG. 1, the previously-noted intake-manifold branch 40 means a substantially tubular portion defining a branch passage extending from intake-port opening end portion 35 of intake port 34 to a bell mouth shaped branch opening end portion 84 opening into the interior space of collector 38. In the intake system of the first embodiment, intake-manifold branch 40 is constructed by first branch portion 68 and second branch portion 76, connected to each other, placing a gasket 86 between an inner peripheral surface of first branch portion 68 and an outer peripheral surface of second branch portion 76 to provide a tight seal between them.

As will be appreciated from the above, in the intake system of the first embodiment, collector 38 is fixedly connected directly to collector mounting bracket 36 mounted on side wall 32 of cylinder head 30, thus enhancing the rigidity needed to supporting the collector and reducing noise and vibration input to the collector. Collector 38 is located in close proximity to side wall 32 of cylinder head 30, and additionally almost all of each of intake-manifold branches 40 is built in collector 38. As a whole, the intake system can be compactly designed. Also, the intake system of the first embodiment is superior in ease of assembly and ease of installation. To realize the compact design (the layout) of the intake system as shown in FIGS. 1–4, it is required to shorten the axial length of intake-manifold branch 40 and to enlarge the capacity of collector 38. Two requirements, namely the shortened axial length of each of intake-manifold branches 40 and the enlarged capacity of collector 38 are satisfied or realized by means of the previously-discussed variable valve actuation system (see FIG. 5), capable of adjusting the intake-air quantity by changing the valve lift characteristic of intake valve 1. As viewed from the lateral cross section shown in FIG. 1, a vertical dimension of collector 38, measured in the vertical direction of the engine substantially along the side wall 32 of cylinder head 30 is dimensioned to be longer than a horizontal dimension of collector 38, measured in the horizontal direction (in a cross direction of the engine), exactly in a direction substantially perpendicular to the side wall 32 of cylinder head 30. A dimension of collector 38 overhanging from the side wall of cylinder head 30 in the cross direction of the engine is reduced or suppressed. Additionally, it is possible to effectively use a dead space below the cylinder head. Thus, it is possible to more greatly enhance the supporting rigidity for collector 38 and simplicity in installation.

Furthermore, air cleaner 46 is interleaved between upper and lower halves 42 and 44 detachably connected to each other. Lower collector portion 44 is formed with first branch portions (68, 68, 68, 68) each constructing a part of the associated intake-manifold branch 40. As clearly shown in FIG. 1, air cleaner 46 is located above the bell mouth shaped branch opening end portion 84 of each of intake-manifold branches 40. Therefore, it is possible to easily replace the air cleaner with a new part only by removing upper collector portion 42 from lower collector portion 44 without removing upper collector portion 44 (providing most of the volumetric capacity of the collector) from the engine. Assuming that a valve overlap period during which both the intake and exhaust valves are open together is set to improve fuel economy and to enhance engine power output, there is a tendency for high-temperature burned gases to flow back to the inlet port side. If air cleaner 46 is directly exposed to high-temperature burnt gases flowing backward, there is a possibility that the high-temperature burnt gases causes damage to or degradation in the air cleaner. For the reasons set out above, in the intake system of the shown embodiment, air cleaner 46 is laid out to be offset from a direction that each of intake-manifold branches 40 is protruded, that is, a discharge direction of burnt gases flowing backward. Concretely, a filtering surface of air cleaner 46 faces in a direction substantially normal to the direction that each of intake-manifold branches 40 is protruded, and air cleaner 46 is positioned or located above the protruded end of each of intake-manifold branches 40.

Figure 1:
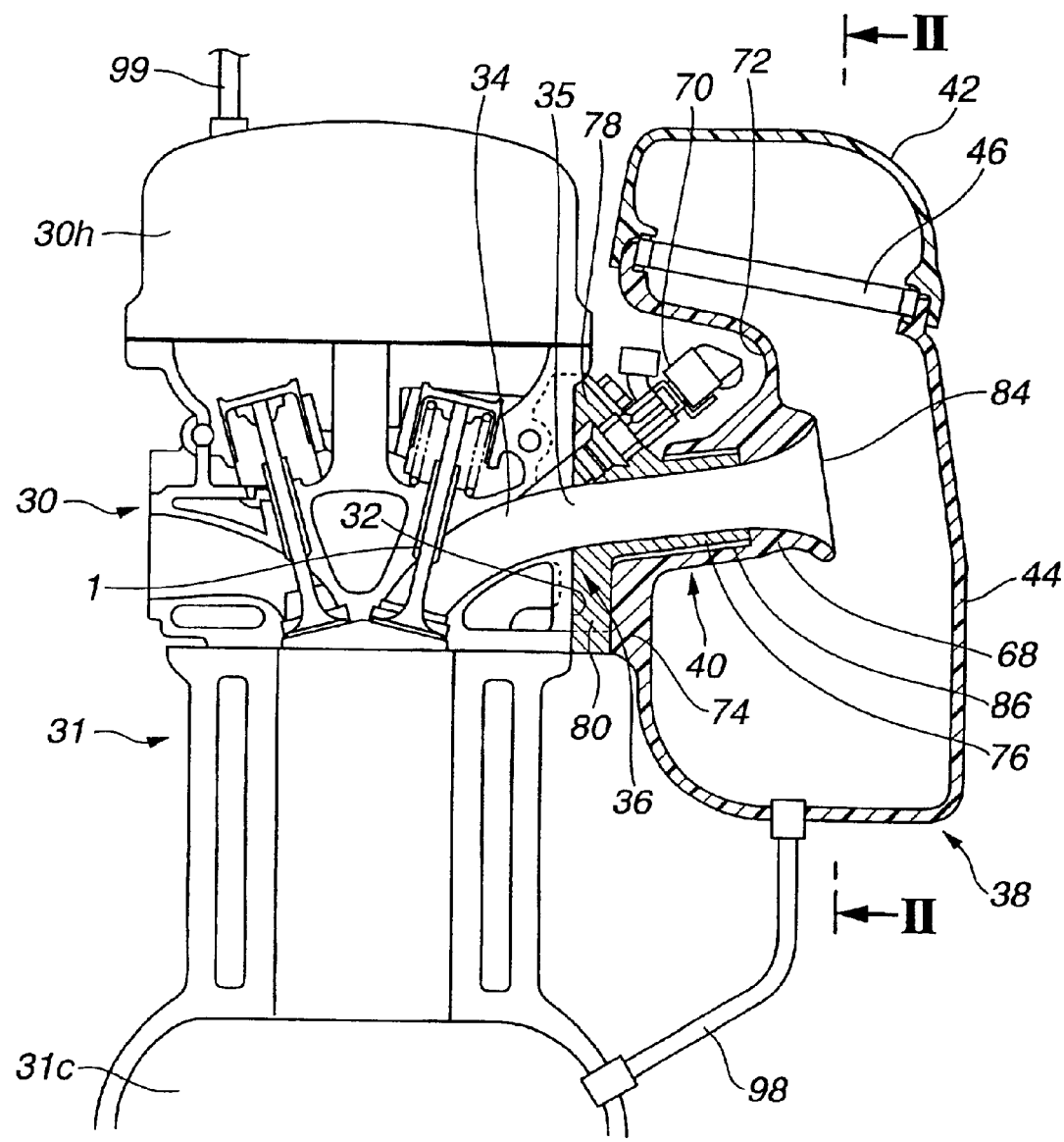
FIG. 1 is a cross-sectional view illustrating a first embodiment of an intake system.

As clearly shown in FIGS. 1 and 2, the intake system of the first embodiment also includes a blow-by gas recirculation system. The blow-by gas recirculation system is mainly comprised of a blow-by gas passage 98, which is connected at one end to a crankcase 31c of cylinder block 31 and at the other end to each of the branch passages (or intake-manifold branches 40) through lower collector portion 44. That is, "blow-by" gases escaping past a piston and piston rings into the crankcase, can be recirculated into the downstream side of vacuum control valve 64. One end of a fresh-air induction passage 99 is connected to the upper space of cylinder head 30, hermetically covered by a cylinder head cover 30h. The other end of fresh-air induction passage 99 is connected to intake pipe 62 upstream of vacuum control valve 64 (see FIG. 2). Additionally, the upper space defined in cylinder head 30 is communicated with crankcase 31c via a communication passage (not shown). The basic operation of the blow-by gas recirculation system shown in FIGS. 1 and 2 is similar to that of a conventional blow-by gas recirculation system of gasoline engines. That is, "blow-by" gases escaping past the piston and piston rings into the crankcase, flows into each of the branch passages or intake-manifold branches 40 by virtue of a vacuum (a negative pressure) created in collector 38. At the same time, fresh air is introduced in the upper space of cylinder head 30 via fresh-air induction passage 99. As fully described later, during full load operation that vacuum control valve 64 is operated at its full-open operating mode, part of the blow-by gas flows via fresh-air induction passage 99 back to intake pipe 62, and then flows into the combustion chamber. Referring to FIG. 2, vacuum control valve 64 is comprised of a butterfly valve 92, a diaphragm type vacuum-operated actuator 94, and a two-position, three-port electromagnetic valve 95. Butterfly-shaped valve 92 is fixed to a rotation shaft 91 in such a manner as to open and close the fluid-flow passage of intake pipe 62. Vacuum-operated actuator 94 is mechanically linked via a linkage 93 to butterfly valve 92. A vacuum detection port 96 is formed in intake pipe 62 downstream of butterfly valve 92. Electromagnetic valve 95 switches a vacuum to be fed to a vacuum chamber of vacuum-operated actuator 94 between the vacuum extracted by vacuum detection port 96 and the vacuum stored in a vacuum tank 97. That is, electromagnetic valve 95 serves to supply a selected one from the vacuum extracted via the vacuum detection port and the vacuum in the vacuum tank to vacuum-operated actuator 94. Vacuum tank 97 is provided to store the vacuum, which is created by means of a vacuum pump (not shown) usually installed on the vehicle for creating vacuum pressure needed for a brake booster or a diaphragm power brake included in a brake system. The vacuum stored in vacuum tank 97 is stronger or higher than the vacuum to be created in the collector.

During a normal engine operating condition, electromagnetic valve 95 is switched to establish fluid communication between vacuum detection port 96 and the vacuum chamber of vacuum-operated actuator 94. Thus, a comparatively weak vacuum created in collector 38 is introduced into the vacuum chamber of vacuum-operated actuator 94, and as a result butterfly valve 92 opens. In the system of the embodiment, the weaker the vacuum introduced into the vacuum chamber of vacuum-operated actuator 94, the smaller the opening degree of butterfly valve 92. Conversely, the stronger the vacuum introduced into the vacuum chamber of vacuum-operated actuator 94, the larger the opening degree of butterfly valve 92. Note that a strong or high vacuum caused by a closed vacuum control valve is indicative of a low pressure and vice versa. Vacuum control valve 64 is responsive to the vacuum in collector 38 so that the vacuum pressure in collector 38 is brought closer to a desired vacuum pressure value (or a predetermined constant vacuum pressure value). That is, vacuum control valve 64 functions as a mechanical collector-vacuum feedback control mechanism that the opening of butterfly valve 92 is automatically controlled or adjusted so that the vacuum pressure in collector 38 is brought closer to the desired vacuum pressure value. The desired vacuum pressure value is properly set, taking into account characteristics of the blow-by gas recirculation system. For instance, the desired vacuum pressure value is set within a vacuum pressure range from −100 mmHg to −200 mmHg.

During a predetermined high load condition (containing a full load condition), electromagnetic valve 95 is switched to establish fluid communication between vacuum tank 97 and the vacuum chamber of vacuum-operated actuator 94. A comparatively strong vacuum stored in vacuum tank 97 is introduced into the vacuum chamber of vacuum-operated actuator 94. Thus, the opening degree of butterfly valve 92 of vacuum control valve 64 rapidly increases and the butterfly valve 92 is kept at its full-open position. As a consequence, a resistance of butterfly valve 92 to fluid flow is reduced to a minimum.

Figure 8:
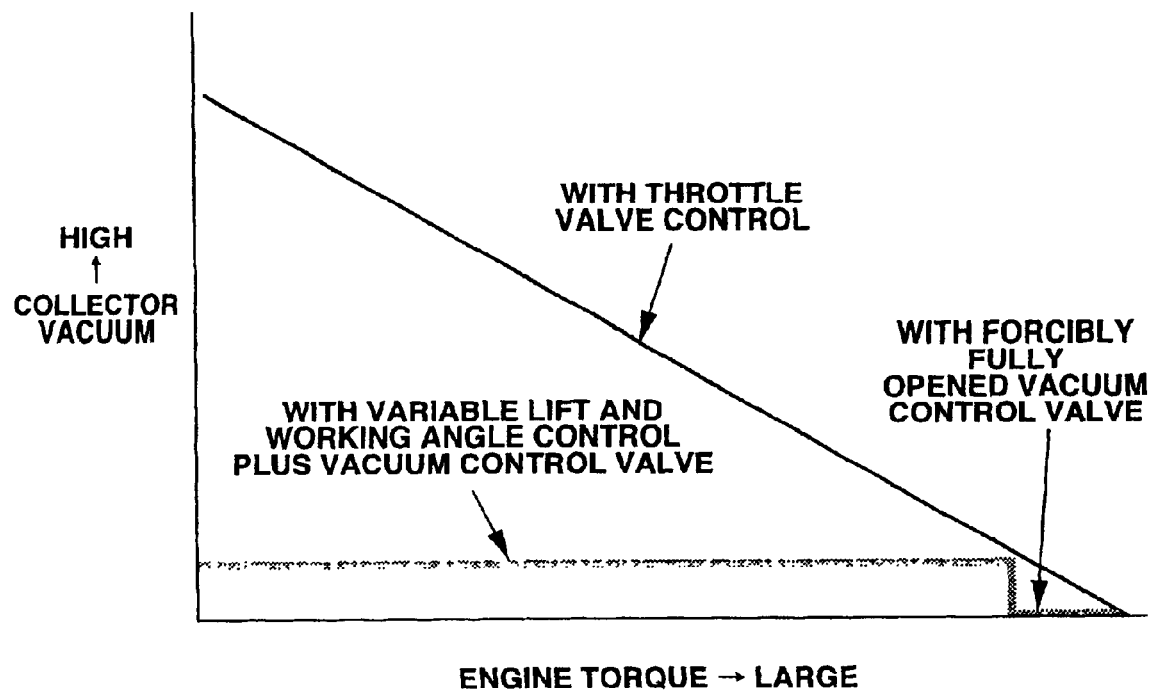
FIG. 8 is a comparative diagram showing a collector vacuum versus engine torque characteristic obtained by throttle valve control and a collector vacuum versus engine torque characteristic obtained by variable lift and working angle control plus vacuum control valve control.

Referring now to FIGS. 7A–7F, there are shown details of the operation of the variable valve actuation system of FIG. 5 and the operation of vacuum control valve 64 OF FIG. 2 in accordance with a change in engine load. As shown in FIG. 7C, the working angle EA of intake valve 1 increases, as the engine load increases. On the other hand, the phase of central angle φ of the working angle of intake valve 1 retards as the engine load increases (see FIG. 7D). The opening of vacuum control valve 64 tends to increase in accordance with an increase in the intake-air quantity, since the vacuum control valve opening is automatically controlled or adjusted so as to maintain the predetermined constant vacuum pressure. In the full load range, the vacuum control valve is forcibly held at the full-open position. As shown in FIGS. 7E and 7F, as the engine load increases, intake valve open timing IVO is gradually advanced to a timing point before TDC, while intake valve closure timing IVC is retarded. The system of the embodiment employing vacuum control valve 64, exhibits a collector vacuum characteristic shown in FIGS. 7A and 8, when increasing the engine load. As can be seen from the collector vacuum characteristic of FIGS. 7A and 8, the vacuum in collector 38 is basically kept at the predetermined constant vacuum pressure value irrespective of the magnitude of engine load (or engine torque). The vacuum pressure in collector 38 becomes almost zero (a less vacuum) only in the full-load range. In contrast to the above, in case of the usual throttle valve control using a conventional throttle valve, as indicated by the comparatively thin line in FIG. 8, the collector vacuum tends to decrease as the engine load (engine torque) increases. The value of vacuum pressure caused by the closed vacuum control valve and the predetermined value of engine load above which vacuum control valve 64 is forcibly controlled to the full-open position are predetermined or preset, so that the value of vacuum pressure mechanically feedback-controlled by means of vacuum control valve never exceeds the value of vacuum pressure created by the throttle valve.

Figure 10:
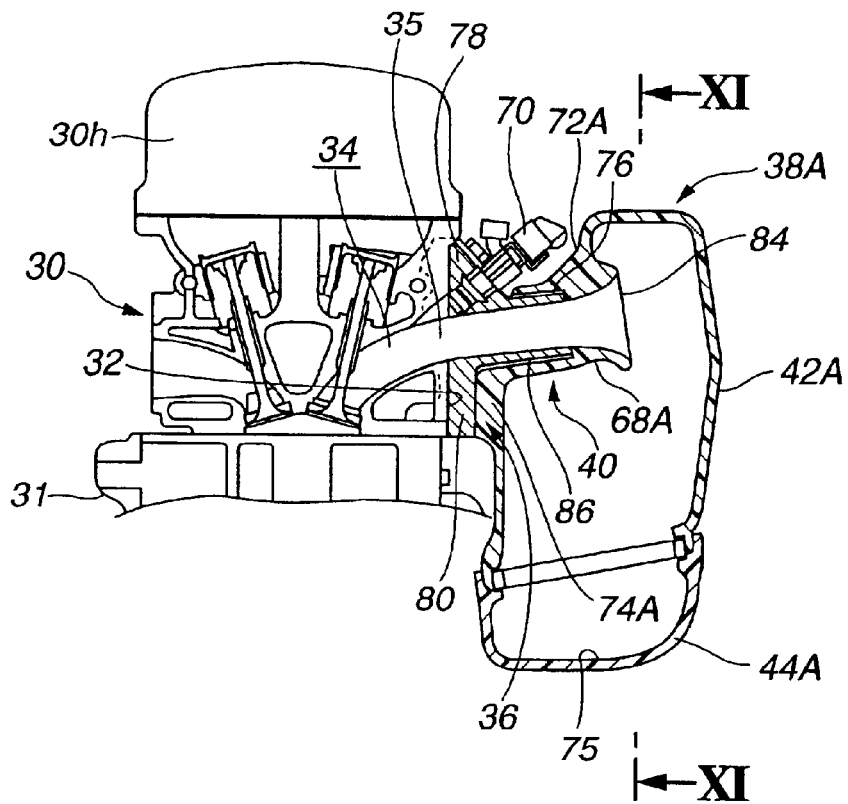
FIG. 10 is a cross-sectional view illustrating a second embodiment of an intake system.
Figure 11:
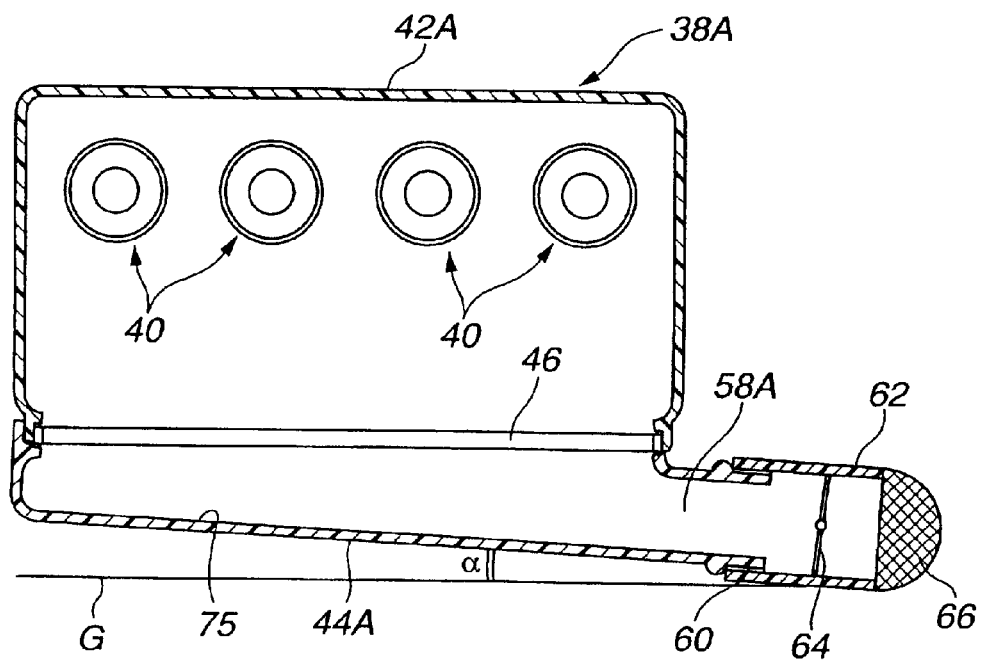
FIG. 11 is a cross-sectional view taken along the line XI—XI of FIG. 10.

Referring now to FIGS. 10 and 11, there is shown the intake system of the second embodiment. As appreciated from comparison between the cross section of the system of the first embodiment shown in FIG. 1 and the cross section of the system of the second embodiment shown in FIG. 10, the split position of upper and lower collector portions 42A and 44A of collector 38A of the second embodiment is different from that of the first embodiment. In the second embodiment, of these two split collector portions 42A and 44A, upper collector portion 42A is larger than lower collector portion 44A and constructs a major part of collector 38A. Upper collector portion 42A constructing the major part of collector 38A has a plurality of first branch portions (68A, 68A, 68A, 68A), a recessed portion 72A, and amounting plate portion 74A, integrally formed with each other. Each of first branch portions 68A is substantially cylindrical in shape and protruded into the interior space of upper collector portion 42A. Each of the first branch portions constructs a part of the associated intake-manifold branch 40. Recessed portion 72A is provided to avoid the interference between collector 38A and fuel injection valve 70.

Mounting plate portion 74A is fixedly connected to collector mounting bracket 36 in such a manner as to be kept in wall contact with the flat surface portion of collector mounting bracket 36. Mounting plate portion 74A is relatively thick-walled in comparison with the other collector portions, to increase rigidity in installation. As shown in FIG. 11, lower collector portion 44A is integrally formed with a substantially cylindrical intake-air inlet 58A to which intake pipe 62 is connected, placing gasket 60 between the inner peripheral surface of intake-air inlet 58A and the outer peripheral surface of intake pipe 62 to provide a tight seal between them. As seen from the cross section of FIG. 11, a bottom surface of lower collector portion 44A integrally formed with intake-air inlet 58A, that is, a bottom surface 75 of collector 38A, is somewhat downwardly inclined toward intake-air inlet 58A under a specified condition that the collector equipped intake system of the second embodiment is installed on the engine cylinder. Exactly speaking, bottom surface 75 of collector 38A is inclined by a predetermined inclination angle α with respect to a reference horizontal plane G, so that the bottom surface 75 of lower collector portion 44A gradually lowers toward intake-air inlet 58A. In presence of entrance of water or moisture into collector 38A due to snow and rain, the moisture or water can be rapidly exhausted to the exterior, while flowing along the inclined bottom surface 75 of lower collector portion 44A. The inclined bottom surface 75 is effective to prevent water or moisture from being collected in the collector. In the system of the second embodiment shown in FIGS. 10 and 11, a filtering surface of air cleaner 46 faces in a direction substantially normal to the direction that each of intake-manifold branches 40 is protruded, and air cleaner 46 is located below the protruded end of each of intake-manifold branches 40. Even when high-temperature burnt gases is discharged from the combustion chamber via each of intake-manifold branches 40 into collector 38A, there is a less possibility that air cleaner 46 is directly exposed to the burnt gases flowing backward. Thus, it is possible to prevent or avoid damage to or degradation in air cleaner 46 owing to the burnt gases.

Figure 12:
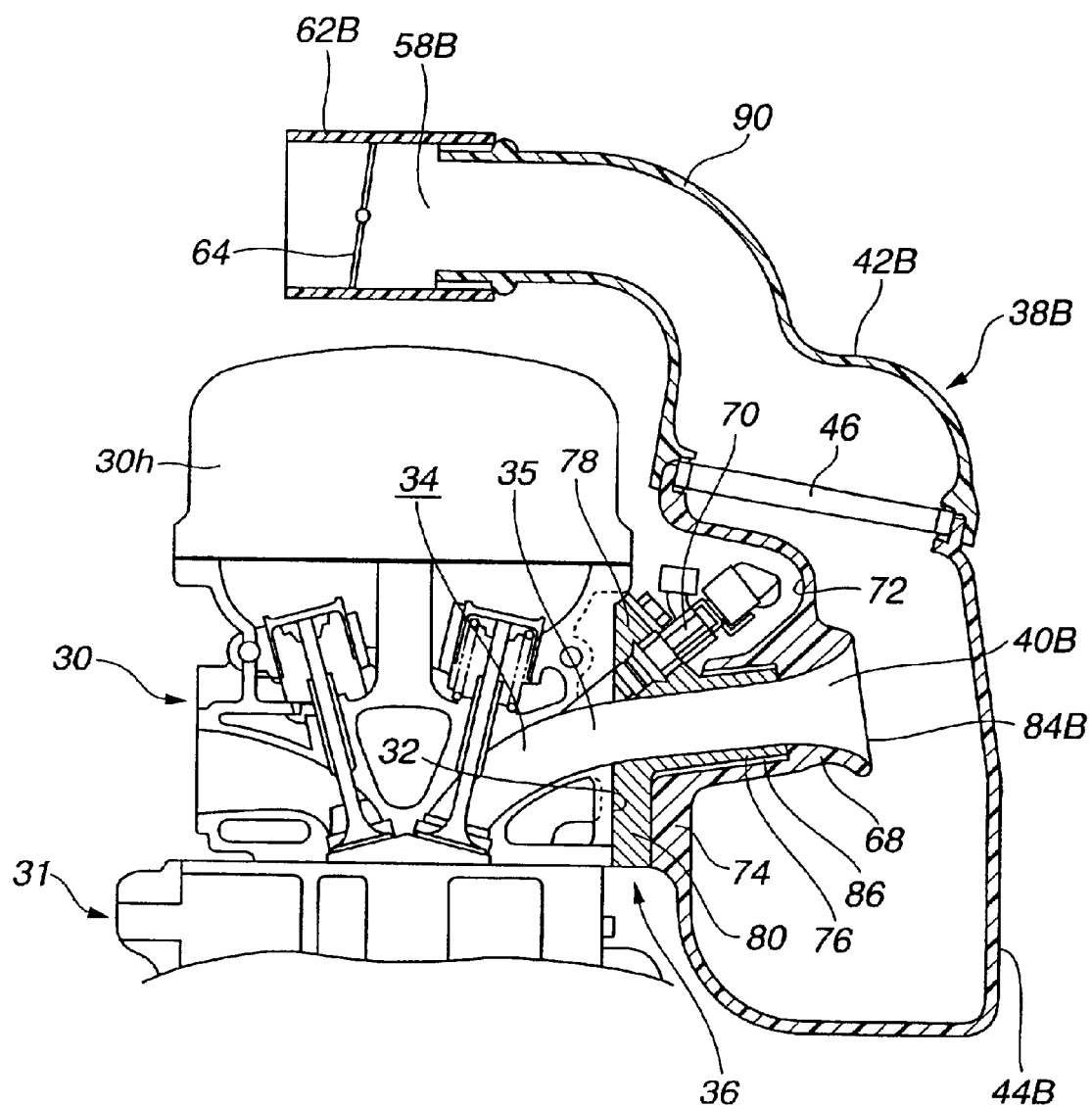
FIG. 12 is a cross-sectional view illustrating a third embodiment of an intake system.
Figure 13:
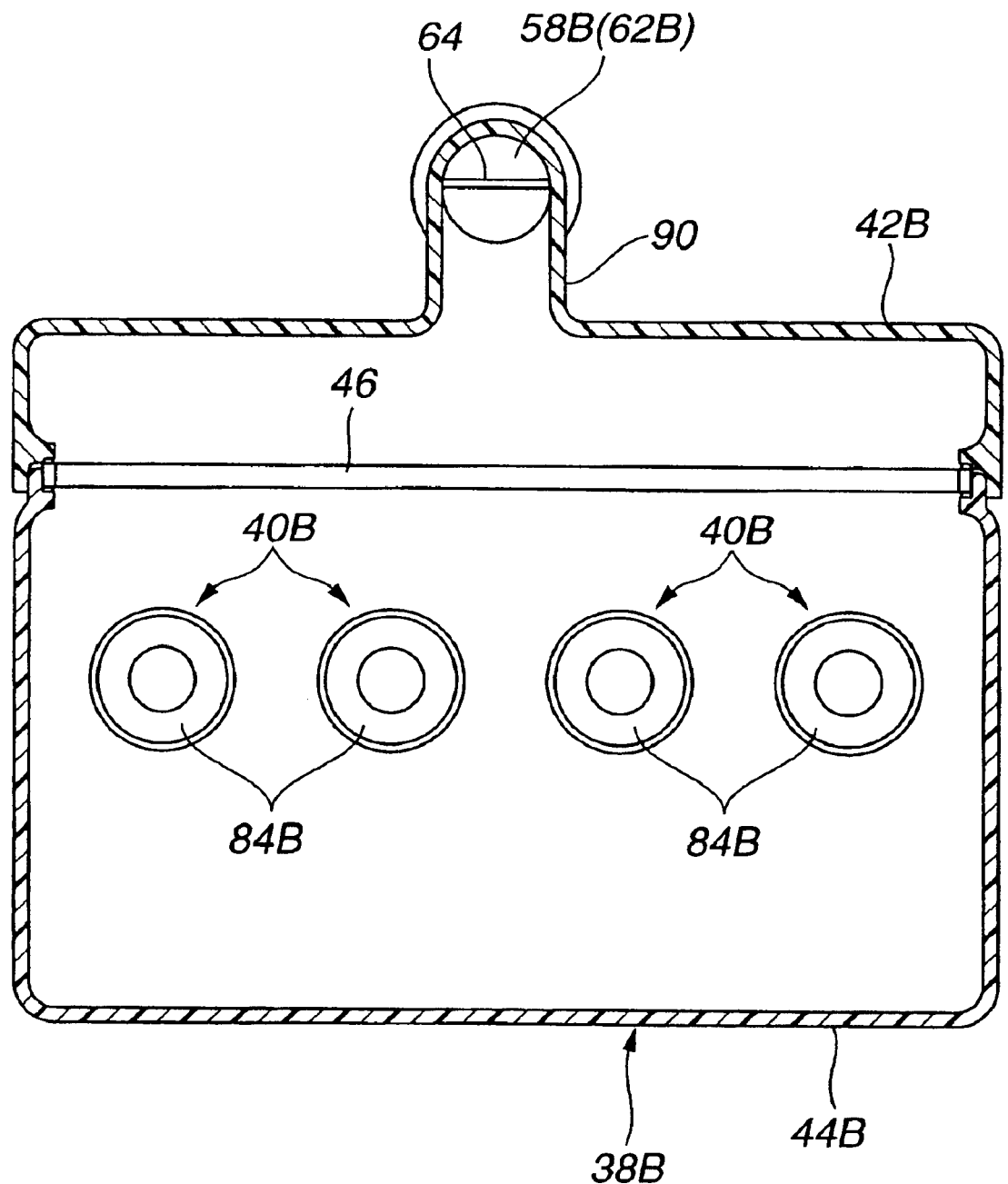
FIG. 13 is a cross-sectional view illustrating the layout of intake-air inlets of the intake system of the third embodiment.

Referring now to FIGS. 12 and 13, there is shown the intake system of the third embodiment. Generally, there is an increased tendency for noise to be created near an intake-air inlet 58B integrally formed with a collector 38B (and near an intake pipe 62B) due to pulsations generated by each of engine cylinders. From the viewpoint of reduced noise and vibration, it is desirable to equally tune or adjust intervals of peak points of pulsations among a plurality of engine cylinders. Assuming that an effective distance or effective length from the inlet-valve port of intake valve 1 constructing part of the combustion chamber of each engine cylinder to intake-air inlet 58B is defined as an entire length of an intake-air passage containing the branch passage, it is desirable to provide as equal an entire intake-air passage length as possible for each engine cylinder. To realize this, in the intake system of the third embodiment of FIGS. 12 and 13, an upper collector portion 42B of collector 38B is formed integral with an auxiliary tube 90. As best seen in FIG. 13, auxiliary tube 90 is located at a substantially central portion of bell mouth shaped branch opening end portions 84B of the plurality of intake-manifold branches 40 in the cylinder row direction. Auxiliary tube 90 extends from the upper portion of upper collector portion 42B such that the opening end portion of auxiliary tube 90 curvedly extends towards cylinder head 31h. The opening end portion of auxiliary tube 90 constructs the intake-air inlet 58B. That is, as clearly shown in FIG. 13, intake-air inlet 58B and intake pipe 62B through which intake air is introduced into collector 38B are substantially centrally located in the cylinder row direction with respect to intake-manifold branches 40B of the plurality of engine cylinders (exactly, the plurality of bell mouth shaped branch opening end portions 84B). Additionally, bell mouth shaped branch opening end portions 84B are aligned with each other and substantially equidistantly spaced from each other in the cylinder row direction. As a consequence, the previously-noted entire intake-air passage length for each cylinder is almost the same. This is advantageous with respect to reduction in noise and vibration. In the intake system of the third embodiment having a shorter intake-manifold branch 40B and a larger capacity collector 38B than a conventional intake system, collector 38B has a major part of the entire intake-air passage length extending from the inlet-valve port of intake valve 1 to intake-air inlet 58B through which air is introduced into collector 38B. Therefore, in such an intake system having a shorter intake-manifold branch and a larger capacity collector, from the viewpoint reduced noise and vibration, it is very effective to substantially centrally locate intake-air inlet 58B with respect to the plurality of bell mouth shaped branch opening end portions 84B of intake-manifold branches 40B in the cylinder row direction.

In the first (see FIGS. 1–3), second (see FIGS. 10–11), and third (see FIGS. 12–13) embodiments, taking into account the location of each of fuel injection valve 70, collector mounting bracket 36 is detachably connected to collector 38B. In lieu thereof, collector mounting bracket 36 may be integrally formed with collector 38B, such that the collector part can be directly connected to the intake-port side wall of cylinder head 30. This eliminates the necessity of the collector mounting bracket.

Figure 14C:
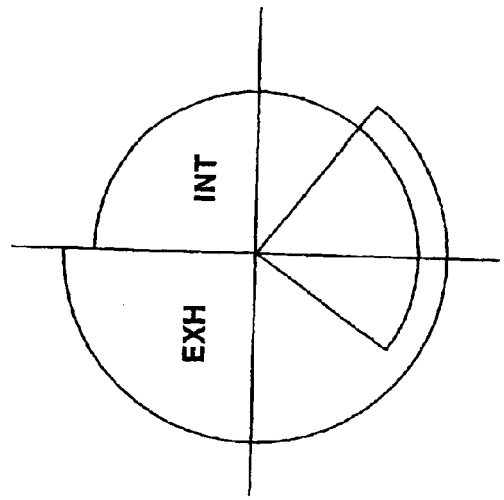
FIGS. 14A–14C are 1st valve timing characteristics, respectively showing idling, a middle load condition, and a high load condition.
Figure 14B:
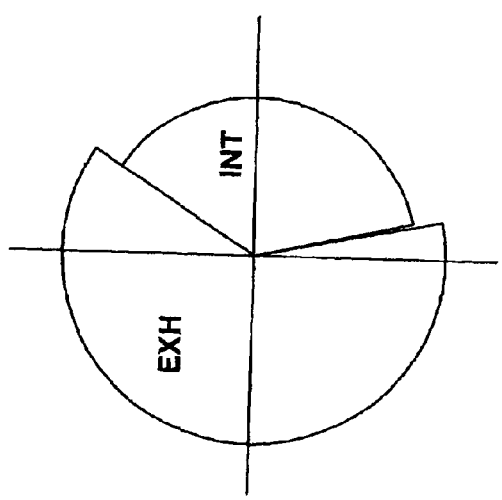
Figure 14A:
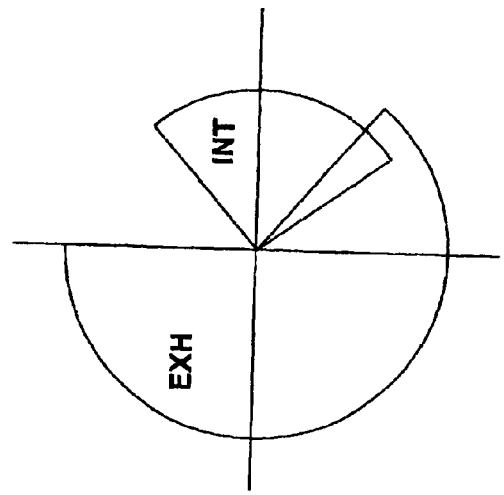

The construction and operation of the intake system of the fourth embodiment are hereunder described in detail in reference to FIGS. 14A–14C. The fundamental construction of the intake system of the fourth embodiment is similar to that of the first embodiment having the two-split collector 38 composed of upper and lower collector portions 42 and 44 both made of a lightweight synthetic resin material. In addition to the above, in the intake system of the fourth embodiment, as a variable valve actuation system, only the previously-discussed variable lift and working angle control mechanism 10 is used in the intake valve side, while only the variable phase control mechanism 20 is used in the exhaust valve side. In order to obtain the operation and effects as discussed later, in the system of the fourth embodiment the phase of central angle φ of the working angle of intake valve 1 is set to a phase retarded by approximately 100 degrees with respect to TDC on the exhaust stroke. For the purpose of enhanced engine power output, the working angle of the exhaust valve is set to a comparatively large working angle (corresponding to a time period of the exhaust stroke) exceeding 180 degrees.

As shown in FIG. 14A, during idling after starting, a relatively small quantity of intake-air is required, and thus the intake valve closure timing IVC is advanced with respect to BDC. In order to enhance the combustion stability during idling, the exhaust valve closure timing EVC is set to a timing point closer to TDC, and additionally the intake valve open timing IVO is greatly retarded with respect to TDC. That is, intake valve open timing IVO is preprogrammed or set so that intake valve 1 is opened when the vacuum (negative pressure) in the engine cylinder becomes high, thus increasing the flow velocity of intake air and promoting atomization of fuel injected. To attain the IVO, IVC, and EVC suitable for idling, the working angle EA of intake valve 1 is adjusted to a smaller working angle by means of variable lift and working angle control mechanism 10 installed on the intake valve side, than that of each of the middle load condition (see FIG. 14B) and the high load condition (see FIG. 14C). On the other and, during idling the phase of central angle φ of the working angle of intake valve 1 is advanced by means of variable phase control mechanism 20 installed on the exhaust valve side, in comparison with the middle load condition.

During high load condition containing high load condition (see FIG. 14C), to increase the intake-air quantity, intake valve closure timing IVC is retarded to a timing point after BDC. At high load operation, the combusting state is good and the combustion stability is comparatively high, and therefore intake valve open timing IVO is set to a timing point nearby TDC, thus reducing the pumping loss. To attain the IVC and IVO suitable for high load condition, the working angle EA of intake valve 1 is adjusted to a larger working angle than a working angle suitable for idling.

During middle load condition or in middle load range (see FIG. 14B), it is desirable to enhance fuel economy by increasing internal EGR (exhaust gas or combustion gas recirculated from the exhaust port through the engine cylinder back to the intake port side) and thus reducing the pumping loss. Suppose that the conventional throttle valve control is used to allow a more complete utilization of internal EGR. In this case, the vacuum is created downstream of the throttle by way of the reduced throttle valve opening, and a valve overlap period during which both the intake and exhaust valves are open together before and after TDC on the exhaust stroke is provided. As a result of this, near TDC on the exhaust stroke, combustion gas is recirculated from the exhaust port through the engine cylinder back to the intake port side in which the vacuum is created, in accordance with the upstroke of the reciprocating piston. The combustion gas (internal EGR) recirculated back to the intake port side is sucked into the engine cylinder together with fresh air, after the exhaust valve has been closed on the downstroke of the piston, that is, on the intake stroke. If such a valve overlap is used during middle load condition in the intake system of the fourth embodiment, there are some drawbacks. In the system of the fourth embodiment, collector 38 is made of a synthetic resin material for a more compact installation and a simplicity in design and air cleaner 46 is built in collector 38. Firstly, if high-temperature combustion gas is recirculated back to the intake port side due to the valve overlap, there is an increased tendency for damage to synthetic resin parts such as collector 38 to occur and for degradation in air cleaner 46 to be promoted. Secondly, in the system of the fourth embodiment that the intake-air quantity is mainly adjusted by way of IVO control and IVC control, even during the middle load operation, the pressure in collector 38 becomes a pressure value closer to an atmospheric pressure or a slight vacuum pressure adjusted by vacuum control valve 64. Thus, even when the intake valve and the exhaust valve both open before TDC, there is a very small quantity of combustion gas (internal EGR) recirculated from the exhaust port through the engine cylinder back to the intake port side. For the reasons set forth above, it is difficult to produce a desired quantity of internal EGR. Therefore, in the system of the fourth embodiment, in order to produce the desired internal EGR without providing the valve overlap period during middle load operation (see FIG. 14B), exhaust valve closure timing EVC is retarded to a timing point after TDC, while intake valve open timing IVO is set or retarded to a timing point after EVC. As a result of this, during the exhaust stroke with the upstroke of the piston, the exhaust valve remains open, while the intake valve remains closed. Just after TDC on the exhaust stroke, the exhaust valve remains open. Therefore, the combustion gas once discharged into the exhaust port, is introduced again into the cylinder. During this time period, the intake valve remains closed, and thus there is no risk of counter-flow of combustion gas to the intake port side to occur. At a timing when an amount of the internal EGR (residual gas) approaches to a desired value, the system of the fourth embodiment operates to close the exhaust valve so as to prevent the combustion gas from being introduced from the exhaust port into the cylinder and thereafter to open the intake valve so as to suck fresh air into the cylinder. Thus, it is possible to allow a more complete utilization of internal EGR without high-temperature burnt gas flowing back to the intake port side. In addition to the above, in the system of the fourth embodiment, as can be seen from the valve timing characteristics of FIGS. 14A, 14B, and 14C, the working angle of the exhaust valve is set to be greater than 180 degrees. As can be appreciated from a phase retard from the EVC point (near TDC) of FIG. 14A to the EVC point (after TDC) and a change in EVO from the EVO point (before BDC) of FIG. 14A to the EVO point (near BDC) of FIG. 14B, exhaust valve open timing EVO tends to approaches to BDC, as exhaust valve closure timing EVC is retarded with respect to TDC. This is advantageous with respect to enhancement in the expansion ratio and thermal efficiency (consequently, improved fuel economy).

During middle load operation, it is necessary to enlarge the working angle EA of intake valve 1, since the intake-air quantity required for the middle load operation is larger than that of the idling operation. In the system of the fourth embodiment, during the middle load condition (see FIG. 14B), the working angle EA of intake valve 1 is set to as large a working angle as possible within a period of time after exhaust valve closure timing EVC. As a result of this, exhaust valve closure timing EVC is substantially identical to intake valve open timing IVO. In other words, intake valve open timing IVO is set to a timing point just after the EVC point.

In the shown embodiment, the collector having a major part of the entire intake-air length extending from the inlet-valve port to the intake-air inlet is made of a synthetic resin material and the air cleaner is built in the collector. In case that there is a less heat damage to the collector and air cleaner, that is, a part of the intake-air passage is not made of synthetic resin and the air cleaner is located outside of the collector, it is possible to allow flow of some combustion gas back to the intake port side. In this case, it is unnecessary to set the EVC point always to a timing point after TDC, and therefore it is possible to ensure a desired quantity of internal EGR by setting of a minus valve overlap that the IVO point is later than the EVC point.

As described previously, in the system of the fourth embodiment related to FIGS. 14A–14C, only the previously-discussed variable lift and working angle control mechanism 10 is used in the intake valve side, while only the variable phase control mechanism 20 is used in the exhaust valve side. In lieu thereof, variable phase control mechanism 20 as well as variable lift and working angle control mechanism 10 may be used in the intake valve side, where as only the variable phase control mechanism 20 may be used in the exhaust valve side. In this case, the construction of the variable valve actuation system is somewhat complicated, however, it is possible to intake valve open timing IVO independently of intake valve closure timing IVC, in such a manner as to adjust the charging efficiency toward a maximum efficiency in accordance with a rise in engine speed, while adjusting the IVO point in the same manner as the system of the fourth embodiment. Thus, it is possible to enhance engine power output within the entire engine operating range.

The construction and operation of the intake system of the fifth embodiment are hereunder described in detail in reference to FIGS. 15A–15C. The fundamental construction of the intake system of the fifth embodiment is similar to that of the first embodiment having the two-slit collector 38 composed of upper and lower collector portions both made of a lightweight synthetic resin material. In the same manner as the fourth embodiment related to FIGS. 14A–14C, in the intake system of the fifth embodiment related to FIGS. 15A–15C, as a variable valve actuation system, only the variable lift and working angle control mechanism 10 is used in the intake valve side, while only the variable phase control mechanism 20 is used in the exhaust valve side. Similarly to the fourth embodiment, in the intake system of the fifth embodiment, the phase of central angle φ of the working angle of intake valve 1 is set to a phase retarded by approximately 100 degrees with respect to TDC on the exhaust stroke. On the other hand, the working angle of the exhaust valve used in the system of the fifth embodiment is set to a comparatively large working angle exceeding 180 degrees and smaller than that of the fourth embodiment, since exhaust valve closure timing EVC has to be advanced with respect to TDC during the middle load operation (see FIG. 15B).

Setting of both of the exhaust valve closure timing EVC and intake valve open timing IVO suitable for the idling condition (see FIG. 15A) and high load condition (see FIG. 15C) in the system of the fifth embodiment is similar to that of the fourth embodiment.

On the other hand, according to the system of the fifth embodiment, during the middle load condition (see FIG. 15B), exhaust valve closure timing EVC is advanced with respect to TDC, whereas intake valve open timing IVO is retarded with respect to TDC. Additionally, a time period B from the TDC position to intake valve open timing IVO is set to be longer than a time period A from exhaust valve closure timing EVC to the TDC position, that is, A<B. Owing to the previously-discussed setting of EVC and IVO performed by the system of the fifth embodiment during the middle load condition (see FIG. 15B), combustion gas can be certainly sealed inside the cylinder, since the intake valve is not yet opened when the exhaust valve is closed during the last phase of the exhaust stroke with the upstroke of the reciprocating piston. That is, it is possible to adjust the amount of internal EGR or the amount of residual gas depending on exhaust valve closure timing EVC. The residual gas sealed inside the cylinder can be compressed during the time period A from exhaust valve closure timing EVC to the TDC position. Thereafter, the system of the fifth embodiment adjusts intake valve closure timing IVC such that intake valve 1 remains closed even at the early part of the intake stroke with the downstroke of the piston after TDC. As a result of this, the residual gas in the cylinder expands, thus resulting in a reduction in in-cylinder pressure. When the time period B (greater than A) from the TDC position to intake valve open timing IVO expires, the in-cylinder pressure remarkably reduces to produce a vacuum pressure in the cylinder. Thereafter, the intake valve is opened. That is, the intake valve is opened at the timing when the residual gas sealed inside the cylinder re-expands and the in-cylinder pressure becomes less than the pressure of the intake port side, so as to effectively introduce fresh air into the cylinder with the intake valve timely opened. Therefore, there is no risk of counter-flow of the residual gas toward the intake port side, thus ensuring a sufficient amount of residual gas (internal EGR). Additionally, in the system of the fifth embodiment, during the middle load condition combustion gas is sealed inside the cylinder by phase-advancing exhaust valve closure timing EVC with respect to TDC. Therefore, for the same quantity of internal EGR, the use of EVC phase-advanced from TDC is superior to the use of valve overlap in a reduction in a pumping loss occurring when the exhaust gas passes through the outlet-valve port, that is, in improved fuel economy.

However, in case of the system of the fifth embodiment, exhaust valve open timing EVO and exhaust valve closure timing EVC are simultaneously adjusted by means of only variable phase control system 20, and additionally the working angle of the exhaust valve side is fixed to a predetermined working angle above 180 degrees, taking into account the maximum engine power output. In such a case, if exhaust valve closure timing EVC is advanced with respect to TDC in order to increase a quantity of internal EGR during the middle load condition, exhaust valve open timing EVO is inevitably greatly phase-advanced toward BDC, because of the fixed working angle of the exhaust valve. This reduces the expansion ratio and increases fuel consumption. That is, it is difficult to reconcile or balance two contradictory requirements, that is, increased engine power output and reduced fuel consumption at middle load operation. To balance these contradictory requirements, the intake system of the sixth embodiment is proposed.

The construction and operation of the intake system of the sixth embodiment are hereunder described in detail in reference to FIGS. 16A–16C. The fundamental construction of the intake system of the fifth embodiment is similar to that of the first embodiment having the two-slit collector 38 composed of upper and lower collector portions both made of a lightweight synthetic resin material. In the system of the sixth embodiment, as a variable valve actuation system, only the variable lift and working angle control mechanism 10 is used in the intake valve side. Note that variable lift and working angle control mechanism 10 as well as variable phase control mechanism 20 is used in the exhaust valve side. The system of the sixth embodiment related to FIGS. 16A–16C has variable lift and working angle control mechanism 10 as well as variable phase control mechanism 20 in the exhaust valve side, thereby being more complicated in construction in comparison with the fifth embodiment related to FIGS. 15A–15C. On the other hand, it is possible to variably adjust exhaust valve open timing EVO and exhaust valve closure timing EVC independently of each other by virtue of variable lift and working angle control mechanism 10 in addition to variable phase control mechanism 20 in the exhaust valve side. Therefore, in the system of the sixth embodiment, exhaust valve closure timing EVC suitable for each of idling, middle and high load operations and exhaust valve open timing EVO suitable for high load operation are adjusted in the same manner as that described for the system of the fifth embodiment related to FIGS. 15A–15C. On the other hand, according to the system of the sixth embodiment, it is possible to set or adjust exhaust valve open timing EVO in close vicinity to BDC, thereby reconciling two contradictory requirements, namely increased engine power output and reduced fuel consumption.

The entire contents of Japanese Patent Application Nos. P2001-77467 (filed Mar. 19, 2001), P2001-69870 (filed Mar. 12, 2001), and P2001-83960 (filed Mar. 23, 2001) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake system of an internal combustion engine, comprising:
   a collector fixedly connected directly to at least one of a side wall of a cylinder head and a collector mounting bracket hermetically covering perimeters of intake-port opening end portions of a plurality of intake ports opening through the side wall;
   a plurality of intake-manifold branches respectively communicating with the plurality of intake ports and protruded into an interior space of the collector;
   a variable valve actuation system that continuously variably adjusts a valve lift characteristic of an intake valve, the variable valve actuation system comprising a first variable valve actuation mechanism capable of continuously variably adjusting the working angle and the lift of the intake valve;
   a control unit configured to be electronically connected to the variable valve actuation system for variably controlling an intake-air quantity through the variable valve actuation system;
   wherein the first variable valve actuation mechanism comprises:
      a drive shaft;
      an eccentric cam driven by the drive shaft;
      a first link fitted to an outer periphery of the eccentric cam to permit relative rotation of the first link to the eccentric cam;
      a control shaft arranged parallel to the drive shaft and comprising a control cam whose axis is eccentric to an axis of the control shaft;
      a rocker arm fitted to an outer periphery of the control cam to permit relative rotation of the rocker arm to the control cam, wherein the rocker arm is connected at one end to the first link so that an oscillating motion of the rocker arm is produced through the first link; and
      a rockable cam rotatably supported on the drive shaft, connected to another end of the rocker arm via a second link, and configured to be in abutted engagement with a valve lifter of the intake valve so that the valve lifter is pushed by cam action of the rockable cam oscillating through the rocker arm;
   wherein the working angle and the lift of the intake valve are simultaneously adjusted by varying a center of rotation of the control cam of the control shaft.

2. The intake system as claimed in claim 1, wherein a vertical dimension of the collector measured substantially along the side wall of the cylinder head is dimensioned to be longer than a horizontal dimension of the collector measured in a direction substantially perpendicular to the side wall.

3. The intake system as claimed in claim 1, further comprising an intake-air inlet through which intake air is introduced into the collector, wherein the intake-air inlet is substantially centrally located in a cylinder row direction with respect to the intake-manifold branches.

4. The intake system as claimed in claim 1, further comprising an air cleaner being built in the collector.

5. The intake system as claimed in claim 4, wherein the air cleaner is configured to be offset from a direction in which each of the intake-manifold branches is protruded into the interior space of the collector.

6. The intake system as claimed in claim 4,
   wherein the collector comprises upper and lower collector portions detachably connected to each other and sandwiching the air cleaner between them; and
   wherein the air cleaner is located above a branch opening end portion of each of the intake-manifold branches.

7. The intake system as claimed in claim 4, wherein a bottom surface of the collector is downwardly inclined toward the intake-air inlet through which intake air is introduced into the collector.

8. The intake system as claimed in claim 4, wherein the intake system is configured so that blow-by gases escaping into a crankcase of the engine are recirculated into a downstream side of the air cleaner.

9. The intake system as claimed in claim 1, further comprising a pressure control valve located upstream of the collector and connected to each of the intake ports to create a vacuum needed for the engine.

10. The intake system as claimed in claim 9, wherein, during full load operation of the engine, an opening degree of the pressure control valve is increased and the pressure control valve is operated at its full-open operating mode so that a vacuum in the collector is reduced to a minimum.

11. The intake system as claimed in claim 9, wherein the pressure control valve comprises a mechanical collector-vacuum feedback control mechanism having a valve opening that is automatically adjusted in response to the vacuum in the collector so that the vacuum in the collector is brought closer to a desired vacuum pressure value.

12. The intake system as claimed in claim 9, wherein the intake system is configured so that blow-by gases escaping into a crankcase of the engine are recirculated into a downstream side of the pressure control valve.

13. The intake system as claimed in claim 1, wherein, in a middle load range of the engine, an intake valve open timing of the intake valve is set to be phase-retarded with respect to an exhaust valve closure timing.

14. The intake system as claimed in claim 13, wherein at least a portion of an intake-system component part creating an intake-air passage connected to each of the intake ports is made of a synthetic resin material.

15. The intake system as claimed in claim 13, wherein,
   in the middle load range, the exhaust valve closure timing is set to be phase-retarded with respect to a top dead center position.

16. The intake system as claimed in claim 13,
   wherein, in the middle load range, the exhaust valve closure timing is set to be phase-advanced with respect to a top dead center position, and
   wherein, in the middle load range, a time period from the top dead center position to the intake valve open timing is set to be longer than a time period from the exhaust valve closure timing to the top dead center position.

17. The intake system as claimed in claim 1, wherein the variable valve actuation system further comprises a second variable valve actuation mechanism capable of continuously variably adjusting a phase of a central angle of the working angle of the intake valve.

18. The intake system of claim 1, wherein the collector is integrally formed with a substantially cylindrical intake-air inlet.

19. The intake system of claim 1, further comprising a gas passage adapted to place a portion of a crankcase of a cylinder block in fluid communication with the collector.

20. The intake system of claim 1, further comprising a second variable valve actuation system that only controls exhaust valve phase.

21. The intake system of claim 20, wherein an intake valve open timing is independent of an intake valve closure timing.

22. An intake system of an internal combustion engine, comprising;
   a collector fixedly connected directly to at least one of a side wall of a cylinder head and a collector mounting bracket hermetically covering perimeters of intake-port opening end portions of a plurality of intake ports opening through the side wall;
   a plurality of intake-manifold branches respectively communicating with the plurality of intake ports and protruded into an interior space of the collector; and
   a recessed portion, which is provided to avoid an interference between the collector and a fuel injection valve that injects fuel spray into an associated one of the intake ports, and formed as a recess on an outer periphery of the collector.

23. An intake system according to claim 22, wherein the recessed portion extends around two opposite sides and a top of the fuel injection valve.

24. The intake system of claim 22, further comprising said fuel injector valve located externally to the collector.

25. An intake system of an internal combustion engine, comprising:
   a collector fixedly connected directly to at least one of a side wall of a cylinder head and a collector mounting bracket hermetically covering perimeters of intake-port opening end portions of a plurality of intake ports opening through the side wall;
   a plurality of intake-manifold branches respectively communicating with the plurality of intake ports and protruded into an interior space of the collector; and
   a pressure control valve located upstream of the collector to adjust a vacuum pressure in the collector to a predetermined constant pressure value.

26. An intake system according to claim 25, wherein during full load operation of the engine, an opening degree of the pressure control valve is increased and the pressure control valve is operated at its full-open operating mode so that a vacuum in the collector is reduced to a minimum.

27. An intake system of an internal combustion engine comprising an intake valve and a variable valve actuation mechanism, the variable valve actuation mechanism comprising:
   (a) a drive shaft;
   (b) an eccentric cam driven by the drive shaft;
   (c) a first link fitted to an outer periphery of the eccentric cam to permit relative rotation of the first link to the eccentric cam;
   (d) a control shaft arranged parallel to the drive shaft and comprising a control cam whose axis is eccentric to an axis of the control shaft;
   (e) a rocker arm fitted to an outer periphery of the control cam to permit relative rotation of the rocker arm to the control cam, wherein the rocker arm is connected at one end to the first link so that an oscillating motion of the rocker arm is produced through the first link;
   (f) a second link rotatably connected to another end of the rocker arm; and
   (g) a rockable cam rotatably supported on the drive shaft, rotatably connected to the second link, and configured to be in abutted engagement with a valve lifter of the intake valve so that the valve lifter is pushed by cam action of the oscillating rockable cam,
   wherein a working angle and a lift of the intake valve are simultaneously adjustable by varying a center of rotation of the control cam of the control shaft, and the variable valve actuation mechanism is capable of continuously variably adjusting the working angle and the lift of the intake valve;
   (h) a control unit connected to the variable valve actuation mechanism and configured to variably control an intake-air quantity to the intake valve;
   (i) a collector fixedly connected directly to at least one of a side wall of a cylinder head and a collector mounting bracket hermetically covering perimeters of intake-port opening end portions of a plurality of intake ports opening through the side wall; and
   (j) a plurality of intake-manifold branches respectively communicating with the plurality of intake ports and protruded into an interior space of the collector.

* * * * *